United States Patent
Eames et al.

(10) Patent No.: US 9,183,443 B2
(45) Date of Patent: *Nov. 10, 2015

(54) METHOD AND APPARATUS FOR CONFIGURING AND TESTING A MACHINE VISION DETECTOR

(71) Applicant: Cognex Corporation, Natick, MA (US)

(72) Inventors: Andrew Eames, Pittsburgh, PA (US); Brian Mirtich, Phoenix, AZ (US); William Silver, Nobleboro, ME (US)

(73) Assignee: Cognex Technology and Investment LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/546,662

(22) Filed: Nov. 18, 2014

(65) Prior Publication Data

US 2015/0169955 A1  Jun. 18, 2015

Related U.S. Application Data

(60) Division of application No. 10/979,572, filed on Nov. 2, 2004, now Pat. No. 8,891,852, which is a continuation-in-part of application No. 14/546,662, filed on Jun. 9, 2004.

(51) Int. Cl.
*G06K 9/00* (2006.01)
*G06T 7/00* (2006.01)
(Continued)

(52) U.S. Cl.
CPC .......... *G06K 9/00624* (2013.01); *G06F 3/0485* (2013.01); *G06F 3/04817* (2013.01); *G06T 7/0004* (2013.01)

(58) Field of Classification Search
CPC . G06T 7/20; G06T 7/0004; G01N 2021/8887
USPC .................... 382/141, 144, 145, 159, 184
See application file for complete search history.

(56) References Cited

U.S. PATENT DOCUMENTS

| 4,214,265 | A | 7/1980 | Olesen |
| 4,292,666 | A | 9/1981 | Hill et al. |

(Continued)

FOREIGN PATENT DOCUMENTS

| DE | 10007985 | 9/2000 |
| DE | 10012715 | 9/2000 |

(Continued)

OTHER PUBLICATIONS

"10-K SEC Filing—iQ 180 Products", *Adaptive Optics Associates* 900 Coles Road, Blackwood, NJ 08012-4683, (Dec. 2003).

(Continued)

*Primary Examiner* — Mike Rahmjoo

(57) ABSTRACT

Disclosed are systems and methods for configuring a vision detector, wherein a training image is obtained from a production line operating in continuous motion so as to provide conditions substantially identical to those that will apply during actual manufacturing and inspection of objects. A training image can be obtained without any need for a trigger signal, whether or not the vision detector might use such a signal for inspecting the objects. Further disclosed are systems and methods for testing a vision detector by selecting, storing, and displaying a limited number of images from a production run, where those images correspond to objects likely to represent incorrect decisions.

12 Claims, 8 Drawing Sheets

(51) Int. Cl.
*G06F 3/0481* (2013.01)
*G06F 3/0485* (2013.01)

(56) References Cited

U.S. PATENT DOCUMENTS

| | | |
|---|---|---|
| 4,384,195 A | 5/1983 | Nosler |
| 4,647,979 A | 3/1987 | Urata |
| 4,679,075 A | 7/1987 | Williams et al. |
| 4,847,772 A | 7/1989 | Michalopoulos et al. |
| 4,916,640 A | 4/1990 | Gasperi |
| 4,962,538 A | 10/1990 | Eppler et al. |
| 4,972,494 A | 11/1990 | White et al. |
| 5,018,213 A | 5/1991 | Sikes |
| 5,040,056 A | 8/1991 | Sager et al. |
| 5,121,201 A | 6/1992 | Seki |
| 5,146,510 A | 9/1992 | Cox et al. |
| 5,164,998 A | 11/1992 | Reinsch et al. |
| 5,177,420 A | 1/1993 | Wada |
| 5,184,217 A | 2/1993 | Doering |
| 5,198,650 A | 3/1993 | Wike et al. |
| 5,210,798 A | 5/1993 | Ekchian et al. |
| 5,233,541 A | 8/1993 | Corwin et al. |
| 5,262,626 A | 11/1993 | Goren et al. |
| 5,271,703 A | 12/1993 | Lindqvist et al. |
| 5,286,960 A | 2/1994 | Longacre et al. |
| 5,298,697 A | 3/1994 | Suzuki et al. |
| 5,317,645 A | 5/1994 | Perozek et al. |
| 5,345,515 A | 9/1994 | Nishi et al. |
| 5,365,596 A | 11/1994 | Dante et al. |
| 5,420,409 A | 5/1995 | Longacre et al. |
| 5,476,010 A | 12/1995 | Fleming et al. |
| 5,481,712 A | 1/1996 | Silver et al. |
| 5,500,732 A | 3/1996 | Ebel et al. |
| 5,562,788 A | 10/1996 | Kitson et al. |
| 5,581,625 A | 12/1996 | Connell et al. |
| 5,687,249 A | 11/1997 | Kato |
| 5,717,834 A | 2/1998 | Werblin et al. |
| 5,734,742 A | 3/1998 | Asaeda |
| 5,742,037 A | 4/1998 | Scola et al. |
| 5,751,831 A | 5/1998 | Ono |
| 5,802,220 A | 9/1998 | Black et al. |
| 5,809,161 A | 9/1998 | Auty et al. |
| 5,825,483 A | 10/1998 | Michael et al. |
| 5,852,669 A | 12/1998 | Eleftheriadis et al. |
| 5,872,354 A | 2/1999 | Hanson |
| 5,917,602 A | 6/1999 | Bonewitz et al. |
| 5,929,418 A | 7/1999 | Ehrhart et al. |
| 5,932,862 A | 8/1999 | Hussey et al. |
| 5,937,096 A | 8/1999 | Kawai |
| 5,942,741 A | 8/1999 | Longacre et al. |
| 5,943,432 A | 8/1999 | Gilmore et al. |
| 5,960,097 A | 9/1999 | Pfeiffer et al. |
| 5,960,125 A | 9/1999 | Michael et al. |
| 5,966,457 A | 10/1999 | Lemelson |
| 6,046,764 A | 4/2000 | Kirby et al. |
| 6,049,619 A | 4/2000 | Anandan et al. |
| 6,061,471 A | 5/2000 | Coleman et al. |
| 6,072,494 A | 6/2000 | Nguyen |
| 6,072,882 A | 6/2000 | White et al. |
| 6,075,882 A | 6/2000 | Mullins et al. |
| 6,078,251 A | 6/2000 | Landt et al. |
| 6,088,467 A | 7/2000 | Sarpeshkar et al. |
| 6,115,480 A | 9/2000 | Washizawa |
| 6,158,661 A | 12/2000 | Chadima et al. |
| 6,160,494 A | 12/2000 | Sodi et al. |
| 6,161,760 A | 12/2000 | Marrs |
| 6,169,535 B1 | 1/2001 | Lee |
| 6,169,600 B1 | 1/2001 | Ludlow |
| 6,173,070 B1 | 1/2001 | Michael et al. |
| 6,175,644 B1 | 1/2001 | Scola et al. |
| 6,175,652 B1 | 1/2001 | Jacobson et al. |
| 6,184,924 B1 | 2/2001 | Schneider et al. |
| 6,215,892 B1 | 4/2001 | Douglass et al. |
| 6,282,462 B1 | 8/2001 | Hopkins |
| 6,285,787 B1 | 9/2001 | Kawachi et al. |
| 6,298,176 B2 | 10/2001 | Longacre et al. |
| 6,301,610 B1 | 10/2001 | Ramser et al. |
| 6,333,993 B1 | 12/2001 | Sakamoto |
| 6,346,966 B1 | 2/2002 | Toh |
| 6,347,762 B1 | 2/2002 | Sims et al. |
| 6,360,003 B1 | 3/2002 | Doi et al. |
| 6,396,517 B1 | 5/2002 | Beck et al. |
| 6,396,949 B1 | 5/2002 | Nichani |
| 6,408,429 B1 | 6/2002 | Marrion et al. |
| 6,446,868 B1 | 9/2002 | Robertson et al. |
| 6,483,935 B1 | 11/2002 | Rostami et al. |
| 6,487,304 B1 | 11/2002 | Szeliski |
| 6,525,810 B1 | 2/2003 | Kipman |
| 6,526,156 B1 | 2/2003 | Black et al. |
| 6,539,107 B1 | 3/2003 | Michael et al. |
| 6,542,692 B1 | 4/2003 | Houskeeper |
| 6,545,705 B1 | 4/2003 | Sigel et al. |
| 6,549,647 B1 | 4/2003 | Skunes et al. |
| 6,573,929 B1 | 6/2003 | Glier et al. |
| 6,580,810 B1 | 6/2003 | Yang et al. |
| 6,587,122 B1 | 7/2003 | King |
| 6,597,381 B1 | 7/2003 | Eskridge et al. |
| 6,608,930 B1 | 8/2003 | Agnihotri et al. |
| 6,618,074 B1 | 9/2003 | Seeley et al. |
| 6,621,571 B1 | 9/2003 | Maeda et al. |
| 6,625,317 B1 | 9/2003 | Gaffin et al. |
| 6,628,805 B1 | 9/2003 | Hansen et al. |
| 6,629,642 B1 | 10/2003 | Swartz et al. |
| 6,646,244 B2 | 11/2003 | Aas et al. |
| 6,668,075 B1 | 12/2003 | Nakamura |
| 6,677,852 B1 | 1/2004 | Landt |
| 6,681,151 B1 | 1/2004 | Weinzimmer et al. |
| 6,714,213 B1 | 3/2004 | Lithicum et al. |
| 6,741,977 B1 * | 5/2004 | Nagaya et al. |
| 6,753,876 B2 | 6/2004 | Brooksby et al. |
| 6,761,316 B2 | 7/2004 | Bridgelall |
| 6,766,414 B2 | 7/2004 | Francis |
| 6,774,917 B1 | 8/2004 | Foote et al. |
| 6,816,063 B2 | 11/2004 | Kubler |
| 6,817,982 B2 | 11/2004 | Fritz et al. |
| 6,891,570 B2 | 5/2005 | Tantalo et al. |
| 6,919,793 B2 | 7/2005 | Heinrich |
| 6,943,842 B2 | 9/2005 | Stavely et al. |
| 6,944,584 B1 | 9/2005 | Tenney et al. |
| 6,947,151 B2 | 9/2005 | Fujii et al. |
| 6,973,209 B2 | 12/2005 | Tanaka |
| 6,985,827 B2 | 1/2006 | Williams et al. |
| 6,987,528 B1 | 1/2006 | Nagahisa et al. |
| 6,997,556 B2 | 2/2006 | Pfleger |
| 6,999,625 B1 | 2/2006 | Nelson et al. |
| 7,062,071 B2 | 6/2006 | Tsujino et al. |
| 7,066,388 B2 | 6/2006 | He |
| 7,070,099 B2 | 7/2006 | Patel |
| 7,085,401 B2 | 8/2006 | Averbuch et al. |
| 7,088,387 B1 | 8/2006 | Freeman et al. |
| 7,088,846 B2 | 8/2006 | Han et al. |
| 7,097,102 B2 | 8/2006 | Patel et al. |
| 7,175,090 B2 | 2/2007 | Nadabar |
| 7,181,066 B1 | 2/2007 | Wagman |
| 7,227,978 B2 | 6/2007 | Komatsuzaki et al. |
| 7,266,768 B2 | 9/2007 | Ferlitsch et al. |
| 7,271,830 B2 | 9/2007 | Robins et al. |
| 7,274,808 B2 | 9/2007 | Baharav et al. |
| 7,280,685 B2 | 10/2007 | Beardsley et al. |
| 7,516,898 B2 | 4/2009 | Knowles et al. |
| 7,604,174 B2 | 10/2009 | Gerst et al. |
| 7,657,081 B2 | 2/2010 | Blais et al. |
| 7,720,364 B2 | 5/2010 | Scott et al. |
| 7,751,625 B2 | 7/2010 | Ulrich et al. |
| 7,889,886 B2 | 2/2011 | Matsugu et al. |
| 7,960,004 B2 | 6/2011 | Yee et al. |
| 7,973,663 B2 | 7/2011 | Hall |
| 7,984,854 B2 | 7/2011 | Nadabar |
| 8,108,176 B2 | 1/2012 | Nadabar et al. |
| 2002/0005895 A1 | 1/2002 | Freeman et al. |
| 2002/0037770 A1 | 3/2002 | Paul et al. |
| 2002/0099455 A1 | 7/2002 | Ward |
| 2002/0177918 A1 | 11/2002 | Pierel et al. |
| 2002/0181405 A1 | 12/2002 | Ying |

(56) References Cited

U.S. PATENT DOCUMENTS

| | | |
|---|---|---|
| 2002/0196342 A1 | 12/2002 | Walker et al. |
| 2003/0113018 A1 | 6/2003 | Nefian et al. |
| 2003/0120714 A1 | 6/2003 | Wolff et al. |
| 2003/0137590 A1 | 7/2003 | Bames et al. |
| 2003/0201328 A1 | 10/2003 | Jam et al. |
| 2003/0227483 A1 | 12/2003 | Schultz et al. |
| 2004/0148057 A1 | 7/2004 | Breed et al. |
| 2004/0218806 A1 | 11/2004 | Miyamoto et al. |
| 2004/0220770 A1 | 11/2004 | Isumi et al. |
| 2005/0184217 A1 | 8/2005 | Kong et al. |
| 2005/0226490 A1 | 10/2005 | Phillips et al. |
| 2005/0254106 A9 | 11/2005 | Silverbrook et al. |
| 2005/0257646 A1 | 11/2005 | Yeager |
| 2005/0275728 A1 | 12/2005 | Mirtich et al. |
| 2005/0275831 A1 | 12/2005 | Silver |
| 2005/0275833 A1 | 12/2005 | Silver |
| 2005/0275834 A1 | 12/2005 | Silver |
| 2005/0276445 A1 | 12/2005 | Silver et al. |
| 2005/0276459 A1 | 12/2005 | Eames et al. |
| 2005/0276460 A1 | 12/2005 | Silver et al. |
| 2005/0276461 A1 | 12/2005 | Silver et al. |
| 2005/0276462 A1 | 12/2005 | Silver et al. |
| 2006/0107211 A1 | 5/2006 | Mirtich et al. |
| 2006/0107223 A1 | 5/2006 | Mirtich et al. |
| 2006/0131419 A1 | 6/2006 | Nunnink |
| 2006/0133757 A1 | 6/2006 | Nunnink |
| 2006/0146337 A1 | 7/2006 | Hartog |
| 2006/0146377 A1 | 7/2006 | Marshall et al. |
| 2006/0223628 A1 | 10/2006 | Walker et al. |
| 2006/0249581 A1 | 11/2006 | Smith et al. |
| 2006/0283952 A1 | 12/2006 | Wang |
| 2007/0009152 A1 | 1/2007 | Kanda |
| 2007/0146491 A1 | 6/2007 | Tremblay et al. |
| 2007/0181692 A1 | 8/2007 | Barkan et al. |
| 2008/0036873 A1 | 2/2008 | Silver |
| 2008/0063245 A1 | 3/2008 | Benkley et al. |
| 2008/0166015 A1 | 7/2008 | Haering et al. |
| 2008/0167890 A1 | 7/2008 | Pannese et al. |
| 2008/0205714 A1 | 8/2008 | Benkley |
| 2008/0219521 A1 | 9/2008 | Benkley |
| 2008/0226132 A1 | 9/2008 | Gardner et al. |
| 2008/0278584 A1 | 11/2008 | Shih et al. |
| 2008/0285802 A1 | 11/2008 | Bramblet et al. |
| 2008/0309920 A1 | 12/2008 | Silver |
| 2008/0310676 A1 | 12/2008 | Silver |
| 2009/0128627 A1 | 5/2009 | Katsuyama et al. |
| 2009/0154779 A1 | 6/2009 | Satyan et al. |
| 2009/0257621 A1 | 10/2009 | Silver |
| 2009/0273668 A1 | 11/2009 | Mirtich et al. |
| 2010/0241901 A1 | 9/2010 | Jahn |
| 2010/0241911 A1 | 9/2010 | Shih |
| 2010/0241981 A1 | 9/2010 | Mirtich et al. |
| 2010/0318936 A1 | 12/2010 | Tremblay et al. |

FOREIGN PATENT DOCUMENTS

| | | |
|---|---|---|
| DE | 10040563 | 2/2002 |
| EP | 0939382 | 9/1999 |
| EP | 0815688 | 5/2000 |
| EP | 20030201328 | 10/2003 |
| EP | 0896290 | 10/2004 |
| EP | 1469420 | 10/2004 |
| EP | 1734456 | 12/2006 |
| EP | 1975849 | 10/2008 |
| GB | 2226130 | 6/1990 |
| GB | 2309078 | 7/1997 |
| JP | 60147602 | 8/1985 |
| JP | S62-113002 | 5/1987 |
| JP | H8122016 | 5/1996 |
| JP | 08-313454 | 11/1996 |
| JP | 09-178670 | 7/1997 |
| JP | 09185710 | 7/1997 |
| JP | 9-288060 | 11/1997 |
| JP | 11-101689 | 4/1999 |
| JP | 2000-84495 | 3/2000 |
| JP | 2000-227401 | 8/2000 |
| JP | 2000-293694 | 10/2000 |
| JP | 2000298103 | 10/2000 |
| JP | 2000-322450 | 11/2000 |
| JP | 2001-109884 | 4/2001 |
| JP | 2001-194323 | 7/2001 |
| JP | 2002-148201 | 5/2002 |
| JP | 2002-148205 | 5/2002 |
| JP | 2002-214153 | 7/2002 |
| JP | 2002-288633 | 10/2002 |
| JP | 2002318202 | 10/2002 |
| JP | 2003270166 | 9/2003 |
| JP | 2004-145504 | 5/2004 |
| WO | WO-96-09597 | 3/1996 |
| WO | WO-0141068 | 11/2000 |
| WO | WO-0215120 | 2/2002 |
| WO | WO0215120 | 2/2002 |
| WO | WO-02075637 | 9/2002 |
| WO | WO-03102859 | 12/2003 |
| WO | WO-2005050390 | 6/2005 |
| WO | WO-2005124317 | 6/2005 |
| WO | WO-2005124709 | 12/2005 |
| WO | WO-2005124719 | 12/2005 |
| WO | WO-2008118419 | 10/2008 |
| WO | WO-2008118425 | 10/2008 |

OTHER PUBLICATIONS

ADSP-BF533 Blackfin Processor Hardware Reference, *Analog Devices Inc.—Media Platforms and Services Group*, Preliminary Revision—Part No. 82-002005-01,(Mar. 2003).

Bi-i, *AnaLogic Computers Ltd.*, (2003).

"Bi-i: Bio-inspired Real-Time Very High Speed Image Processing Systems", *AnaLogic Computers Ltd.*, http://www.analogic-computers.com/cgi-bin/phprint21.php,(2004).

Blackfin Processor Instruction Set Reference, *Analog Devices, Inc.*, Revision 2.0, Part No. 82-000410-14,(May 2003).

CCD/CMOS Sensors Spot Niche Application, *PennWell Corporation*, Vision System Design—Imaging and Machine Vision Technology,(2004).

"Cellular device processes at ultrafast speeds", *VisionSystems Design*, (Feb. 2003).

"Cognex 3000/4000/5000 Image Processing", Revision 7.4 590-0135 *Edge Detection Tool*, (1996).

Cognex 4000/5000 SMD Placement Guidance Package, User's Manual, Release 3.8.00, Chapter 15, 590-6168, (1998).

"Cognex VisionPro", *Getting Started—QuickStart Tutorial*, Cognex Corporation, 590-6560, Revision 3.5,(May 2004),69-94.

"CV-2100 Series", *Keyence America* http://www.keyence.com/products/vision/cv_2100_spec.html, High-Speed Digital Machine Vision System,(Dec. 29, 2003).

CVL Vision Tools Guide, *Cognex MVS-8000 Series*, Chapter 5, Symbol Tool, CVL 5.4,(Dec. 1999).

"HawkEye 1515—Smart Camera Reader for Directly Marked Data Matrix Codes", *RVSI* 486 Amherst Street, Nashua, NH 03063, (2004).

"ICS 100—Intelligent Camera Sensor", SICK Product Information, SICK Industrial Sensors, 6900 West 110th Street, Minneapolis, MN 55438 www.sickusa.com (Jan. 3, 2002).

"Laser Scanning Product Guide", *Adaptive Optics Associates—Industrial Products and Systems*, 90 Coles Road, Blackwood, NJ 08012, Industrial Holographic and Conventional Laser 1D, Omnidirectional Bar Codes Scanners,(Mar. 2003).

"LM9630 100 X 128, 580 fps UltraSensitive Monochrome CMOS Image Sensor", *National Semiconductor Corp.*, www.national.com Rev. 1.0,(Jan. 2004).

"Matsushita Imagecheckers", NAiS Machine Vision—Matsushita Machine Vision Systems, (2003).

"Matsushita LightPix AE10", NAiS Machine Vision—Matsushita Machine Vision Systems, (2003).

"SmartCapture Tool", Feature Fact Sheet, VisionX Inc., www.visionxinv.com, (2003).

Allen-Bradley, "Bulletin 2803 VIM Vision Input Module", Cat. No. 2803-VIM2, Printed USA,(1991. Submitted in 3 parts.).

(56) References Cited

OTHER PUBLICATIONS

Allen-Bradley, "User's Manual", *Bulletin 2803 VIM Vision Input Module*, Cat. No. 2803-VIM1,(1987.).
Allen-Bradley, "Bulletin 5370 CVIM Configurable Vision Input Module", *User Manual* Cat. No. 5370-CVIM, (1995.).
Apple Computer Inc., *Studio Display User's Manual online*, retrieved on Nov. 24, 2010, retrieved from the Internet http://manuals.info.apple.com/en/studioDisplay_15inLCDUserManual.pdf,(1998).
Asundi et al., "High Speed TDI Imaging for Peripheral Inspection," Proc. SPIE vol. 2423. Machine Vision Applications in Industrial Inspection III. Frederick Y. Wu, Stephen S. Wilson; Eds., (Mar. 1995) 189-194.
Baillard et al., "Automatic Reconstruction of Piecewise Planar Models from Multiple Views," CVPR vol. 02. No. 2(1999) 2559.
Bauer, Peter "Special Editiion Using Adobe Photoshop CS and Illustrator CS", Indianapolis, IN: Que. Published Mar. 2004. Accessed: Safari Tech Books Online. Web. Feb. 4, 2014. p. 283 and Chapters 9 and 28.
Baumberg et al., "Learning Flexible Models from Image Sequences", University of Leeds, School of Computer Studies, Research Report Series, Report 93.36 (Oct. 1993) pp. 1-13.
Chang, Dingding et al., "Feature Detection of Moving Images using a Hierarchical Relaxation Method", *IEICE Trans. Inf. & Syst.*, vol. E79-D, (Jul. 7, 1996).
Chen, Y. H., "Computer Vision for General Purpose Visual Inspection: a Fuzzy Logic Approach", *Optics and Lasers in Engineering 22*, Elsevier Science Limited, vol. 22, No. 3,(1995),pp. 182-192.
Cognex Corporation, "VisionPro Getting Started", Revision 3.2, Chapter 5, 590-6508, copyright 2003.
Cognex Corporation, "3000/4000/5000 Vision Tools", revision 7.6, 590-0136, Chapter 13, (1996).
Cognex Corporation, "Cognex 3000/4000/5000", *Vision Tools*, Revision 7.6, 590-0136, Chapter 10 Auto-Focus, (1996).
Cognex Corporation, "Sensorpart FA45 Vision Sensor", (Sep. 29, 2006).
Cognex Corporation, "Screen shot of the CheckMate GUI Ver 1.6", (Jan. 2005).
Cordin Company, "Electronic Imaging Systems", *High Speed Imaging Solutions: 200-500 Series Cameras*, (Aug. 4, 2004).
Corke, Peter I., et al., "Real Time Industrial Machine Vision", *Electrical Engineering Congress* Sydney, Australia, CSIRO Division of Manufacturing Technology,(1994).
Demotte, Donald, "Visual Line Tracking", Application Overview & Issues Machine Vision for Robot Guidance Workshop, (May 5, 2004).
Denis, Jolivet "LabView and IMAQ Vision Builder Provide Automated Visual Test System", *Semiconductor: IMAQ Advanced Analysis Toolkit*, IMAQ Vision Builder—LabView—National Instruments—XP002356529—URL http://www.ni.com/pdf/csma/us/JNDESWG.pdf,(2001).
Di Mauro, E. C., et al., "Check—a generic and specific industrial inspection tool", *IEE Proc.-Vis. Image Signal Process.*, vol. 143, No. 4,(Aug. 27, 1996),pp. 241-249.
Haering, N. et al., "Visual Event Detection", *Kluwer Academic Publishers*, Chapter 2, Section 8,(2001).
Hunt, Shane C., "Mastering Microsoft PhotoDraw 2000", *Sybex, Inc.*, San Francisco,(May 21, 1999),400 p.
IBM, "Software Controls for Automated Inspection Device Used to Check Interposer Buttons for Defects", *IP.com Journal*, IP.com Inc., West Henrietts, NY, US, (Mar. 27, 2003).
Integrated Design Tools, "High-Speed CMOS Digital Camera", *X-Stream Vision User's Manual*, (2000).
IO Industries, "High Speed Digital Video Recording Software 4.0", *IO industries, Inc.*—Ontario, CA, (2002).
Kahn, Phillip "Building blocks for computer vision systems", *IEEE Expert*, vol. 8, No. 6, XP002480004,(Dec. 6, 1993),40-50.
Kim, ZuWhan et al., "Automatic Description of Complex Buildings with Multiple Images," IEEE 0-7695-0813-8/00 (2000), 155-162.
KSV Instruments Ltd., "HiSIS 2002—High Speed Imaging System", www.ksvltd.fi,(Sep. 24, 2004).
Lavision GmbH, "High Speed CCD/CMOS Camera Systems", *Overview of state-of-the-art High Speed Digital Camera Systems—UltraSpeedStar*, www.lavision.de,(Sep. 24, 2004).
Marsh, R et al., "The application of knowledge based vision to closed-loop control of the injection molding process", *SPIE* vol. 3164, Faculty of Engineering University of the West of England United Kingdom,(1997),605-16.
Matrox, "Interactive Windows Imaging Software for Industrial and Scientific Applications", *Inspector 4.0—Matrox Imaging*, (Apr. 15, 2002),8.
National Instruments, "IMAQVision Builder Tutorial", *IMAQ* XP-002356530, http://www.ni.com/pdf/manuals/322228c.pdf,(Dec. 2000).
National Instruments, "IMAQVision Builder Tutorial", *IMAQ XP-002356530*, b, ttp://www.ni.com.'pdf,'manuals/322228c.pdf, (Dec. 2000).
Olympus Industrial, "Design Philosophy", *i-speed*, (2002),4.
Olympus Industrial, "High Speed, High Quality Imaging Systems", *i-speed Product Brochure—Publisher Olympus Industrial*, (2002),16.
Photron USA, "Ultima APX", (Sep. 24, 2004).
Photron USA, "FastCam PCI", (Sep. 24, 2004).
Photron USA, "Ultima 512", (Sep. 24, 2004).
Photron USA, "Ultima 1024", (Sep. 24, 2004).
Photron USA, "FastCam-X 1280 PCI", (Sep. 24, 2004).
Rohr, K., "Incremental Recognition of Pedestrians from Image Sequences", CVPR93, (1993).
RVSI, "Smart Camera Reader for Directly Marked Data Matrix Codes", *HawkEye 1515 with GUI*, (2004).
Siemens AG, "Simatic Machine Vision", Simatic VS 100 Series, www.siemens.com/machine-vision (Apr. 1, 2003).
Stauffer, Chris et al., "Tracking-Based Automatic Object Recongnition," Artificual Intelligence Laboratory, Massachusetts Institute of Technology, Cambridge, MA http://www.ai.mit.edu, (2001), pp. 133-134.
Stemmer Imaging GmbH, "Going Multimedia with Common Vision Blox", *Product News*, www.stemmer-imaging.de,(Mar. 3, 2004).
Uno, T. et al., "A Method of Real-Time Recognition of Moving Objects and its Application", *Pattern Recognition*; Pergamon Press, vol. 8, pp. 201-208, (1976),pp. 201-208.
Vietze, Oliver "Miniaturized Vision Sensors for Process Automation", (Jan. 2, 2005).
West, Perry C., "High Speed, Real-Time Machine Vision", *Imagenation and Automated Vision Systems, Inc.*, (2001).
Whelan, P. et al., "Machine Vision Algorithms in Java", *Chapter 1—An Introduction to Machine Vision*, Springer-Verlag, XP002480005,(2001).
Wilson, Andrew "CMOS/CCD sensors spot niche applications", Vision Systems Design, (Jun. 2003).
Wright, Anne et al., "Cognachrome Vision System User's Guide", *Newton Research Labs*, Manual Edition 2.0, Documents Software Version 26.0,(Jun. 3, 1996).
Zarandy, Akos et al., "Ultra-High Frame Rate Focal Plane Image Sensor and Processor", *IEEE Sensors Journal*, vol. 2, No. 6,(2002).
Zarandy, A et al., "Vision Systems Based on the 128X128 Focal Plane Cellular Visual Microprocessor Chips", IEEE (Mar. 2003), III-518-III-521.

* cited by examiner

METHOD AND APPARATUS FOR CONFIGURING AND TESTING A MACHINE VISION DETECTOR

RELATED APPLICATION

This application is a divisional of U.S. patent application Ser. No. 10/979,572, filed on Nov. 2, 2004, entitled, METHOD AND APPARATUS FOR CONFIGURING AND TESTING A MACHINE VISION DETECTOR, the teachings of which are expressly incorporated herein by reference and which is a continuation-in-part of U.S. patent application Ser. No. 10/865,155, entitled METHOD AND APPARATUS FOR VISUAL DETECTION AND INSPECTION OF OBJECTS, by William M. Silver, filed Jun. 9, 2004, the teachings of which are expressly incorporated herein by reference, and referred to herein as the "Vision Detector Method and Apparatus".

BACKGROUND OF THE INVENTION

1. Field of the Invention

The invention relates to automated detection and inspection of objects being manufactured on a production line, and more particularly to the related fields of industrial machine vision and automated image analysis.

2. Description of the Related Art

Industrial manufacturing relies on automatic inspection of objects being manufactured. One form of automatic inspection that has been in common use for decades is based on optoelectronic technologies that use electromagnetic energy, usually infrared or visible light, photoelectric sensors, and some form of electronic decision making.

One well-known form of optoelectronic automatic inspection uses a device that can capture a digital image of a two-dimensional field of view in which an object to be inspected is located, and then analyze the image and make decisions. Such a device is usually called a machine vision system, or simply a vision system. The image is captured by exposing a two-dimensional array of photosensitive elements for a brief period, called the integration or shutter time, to light that has been focused on the array by a lens. The array is called an imager and the individual elements are called pixels. Each pixel measures the intensity of light falling on it during the shutter time. The measured intensity values are then converted to digital numbers and stored in the memory of the vision system to form the image, which is analyzed by a digital processing element such as a computer, using methods well-known in the art to determine the status of the object being inspected.

In some cases the objects are brought to rest in the field of view, and in other cases the objects are in continuous motion through the field of view. An event external to the vision system, such as a signal from a photodetector, or a message from a PLC, computer, or other piece of automation equipment, is used to inform the vision system that an object is located in the field of view, and therefore an image should be captured and analyzed. Such an event is called a trigger.

Machine vision systems have limitations that arise because they make decisions based on a single image of each object, located in a single position in the field of view (each object may be located in a different and unpredictable position, but for each object there is only one such position on which a decision is based). This single position provides information from a single viewing perspective, and a single orientation relative to the illumination. The use of only a single perspective often leads to incorrect decisions. It has long been observed, for example, that a change in perspective of as little as a single pixel can in some cases change an incorrect decision to a correct one. By contrast, a human inspecting an object usually moves it around relative to his eyes and the lights to make a more reliable decision.

Machine vision systems have additional limitations arising from their use of a trigger signal. The need for a trigger signal makes the setup more complex—a photodetector must be mounted and adjusted, or software must be written for a PLC or computer to provide an appropriate message. When a photodetector is used, which is almost always the case when the objects are in continuous motion, a production line changeover may require it to be physically moved, which can offset some of the advantages of a vision system. Furthermore, photodetectors can only respond to a change in light intensity reflected from an object or transmitted along a path. In some cases, such a condition may not be sufficient to reliably detect when an object has entered the field of view.

Some prior art vision systems used with objects in continuous motion can operate without a trigger using a method often called self-triggering. These systems typically operate by monitoring one or more portions of captured images for a change in brightness or color that indicates the presence of an object. Self-triggering is rarely used in practice due to several limitations:

The vision systems respond too slowly for self-triggering to work at common production speeds;

The methods provided to detect when an object is present are not sufficient in many cases; and The vision systems do not provide useful output signals that are synchronized to a specific, repeatable position of the object along the production line, signals that are typically provided by the photodetector that acts as a trigger and needed by a PLC or handling mechanism to take action based on the vision system's decision.

Many of the limitations of machine vision systems arise in part because they operate too slowly to capture and analyze multiple perspectives of objects in motion, and too slowly to react to events happening in the field of view. Since most vision systems can capture a new image simultaneously with analysis of the current image, the maximum rate at which a vision system can operate is determined by the larger of the capture time and the analysis time. Overall, one of the most significant factors in determining this rate is the number of pixels comprising the imager.

The time needed to capture an image is determined primarily by the number of pixels in the imager, for two basic reasons. First, the shutter time is determined by the amount of light available and the sensitivity of each pixel. Since having more pixels generally means making them smaller and therefore less sensitive, it is generally the case that increasing the number of pixels increases the shutter time. Second, the conversion and storage time is proportional to the number of pixels. Thus the more pixels one has, the longer the capture time.

For at least the last 25 years, prior art vision systems generally have used about 300,000 pixels; more recently some systems have become available that use over 1,000,000, and over the years a small number of systems have used as few as 75,000. Just as with digital cameras, the recent trend is to more pixels for improved image resolution. Over the same period of time, during which computer speeds have improved a million-fold and imagers have changed from vacuum tubes to solid state, machine vision image capture times generally have improved from about 1/30 second to about 1/60 second, only a factor of two. Faster computers have allowed more sophisticated analysis, but the maximum rate at which a vision system can operate has hardly changed.

The Vision Detector Method and Apparatus teaches novel methods and systems that can overcome the above-described limitations of prior art machine vision systems. These teachings also provide fertile ground for innovation leading to improvements beyond the scope of the original teachings. In the following section the Vision Detector Method and Apparatus is briefly summarized, and a subsequent section lays out the problems to be addressed by the present invention.

Vision Detector Method and Apparatus

The Vision Detector Method and Apparatus provides systems and methods for automatic optoelectronic detection and inspection of objects, based on capturing digital images of a two-dimensional field of view in which an object to be detected or inspected may be located, and then analyzing the images and making decisions. These systems and methods analyze patterns of brightness reflected from extended areas, handle many distinct features on the object, accommodate line changeovers through software means, and handle uncertain and variable object locations. They are less expensive and easier to set up than prior art machine vision systems, and operate at much higher speeds. These systems and methods furthermore make use of multiple perspectives of moving objects, operate without triggers, provide appropriately synchronized output signals, and provide other significant and useful capabilities that will be apparent to those skilled in the art.

One aspect of the Vision Detector Method and Apparatus is an apparatus, called a vision detector, that can capture and analyze a sequence of images at higher speeds than prior art vision systems. An image in such a sequence that is captured and analyzed is called a frame. The rate at which frames are captured and analyzed, called the frame rate, is sufficiently high that a moving object is seen in multiple consecutive frames as it passes through the field of view (FOV). Since the objects moves somewhat between successive frames, it is located in multiple positions in the FOV, and therefore it is seen from multiple viewing perspectives and positions relative to the illumination.

Another aspect of the Vision Detector Method and Apparatus is a method, called dynamic image analysis, for inspecting objects by capturing and analyzing multiple frames for which the object is located in the field of view, and basing a result on a combination of evidence obtained from each of those frames. The method provides significant advantages over prior art machine vision systems that make decisions based on a single frame.

Yet another aspect of the Vision Detector Method and Apparatus is a method, called visual event detection, for detecting events that may occur in the field of view. An event can be an object passing through the field of view, and by using visual event detection the object can be detected without the need for a trigger signal.

Additional aspects of the Vision Detector Method and Apparatus will be apparent by a study of the figures and detailed descriptions given therein.

In order to obtain images from multiple perspectives, it is desirable that an object to be detected or inspected moves no more than a small fraction of the field of view between successive frames, often no more than a few pixels. According to the Vision Detector Method and Apparatus, it is generally desirable that the object motion be no more than about one-quarter of the FOV per frame, and in typical embodiments no more than 5% or less of the FOV. It is desirable that this be achieved not by slowing down a manufacturing process but by providing a sufficiently high frame rate. In an example system the frame rate is at least 200 frames/second, and in another example the frame rate is at least 40 times the average rate at which objects are presented to the vision detector.

An exemplary system is taught that can capture and analyze up to 500 frames/second. This system makes use of an ultra-sensitive imager that has far fewer pixels than prior art vision systems. The high sensitivity allows very short shutter times using very inexpensive LED illumination, which in combination with the relatively small number of pixels allows very short image capture times. The imager is interfaced to a digital signal processor (DSP) that can receive and store pixel data simultaneously with analysis operations. Using methods taught therein and implemented by means of suitable software for the DSP, the time to analyze each frame generally can be kept to within the time needed to capture the next frame. The capture and analysis methods and apparatus combine to provide the desired high frame rate. By carefully matching the capabilities of the imager, DSP, and illumination with the objectives of the invention, the exemplary system can be significantly less expensive than prior art machine vision systems.

The method of visual event detection involves capturing a sequence of frames and analyzing each frame to determine evidence that an event is occurring or has occurred. When visual event detection used to detect objects without the need for a trigger signal, the analysis would determine evidence that an object is located in the field of view.

In an exemplary method the evidence is in the form of a value, called an object detection weight, that indicates a level of confidence that an object is located in the field of view. The value may be a simple yes/no choice that indicates high or low confidence, a number that indicates a range of levels of confidence, or any item of information that conveys evidence. One example of such a number is a so-called fuzzy logic value, further described below and in the Vision Detector Method and Apparatus. Note that no machine can make a perfect decision from an image, and so it will instead make judgments based on imperfect evidence.

When performing object detection, a test is made for each frame to decide whether the evidence is sufficient that an object is located in the field of view. If a simple yes/no value is used, the evidence may be considered sufficient if the value is "yes". If a number is used, sufficiency may be determined by comparing the number to a threshold. Frames where the evidence is sufficient are called active frames. Note that what constitutes sufficient evidence is ultimately defined by a human user who configures the vision detector based on an understanding of the specific application at hand. The vision detector automatically applies that definition in making its decisions.

When performing object detection, each object passing through the field of view will produce multiple active frames due to the high frame rate of the vision detector. These frames may not be strictly consecutive, however, because as the object passes through the field of view there may be some viewing perspectives, or other conditions, for which the evidence that the object is located in the field of view is not sufficient. Therefore it is desirable that detection of an object begins when a active frame is found, but does not end until a number of consecutive inactive frames are found. This number can be chosen as appropriate by a user.

Once a set of active frames has been found that may correspond to an object passing through the field of view, it is desirable to perform a further analysis to determine whether an object has indeed been detected. This further analysis may consider some statistics of the active frames, including the number of active frames, the sum of the object detection weights, the average object detection weight, and the like.

The method of dynamic image analysis involves capturing and analyzing multiple frames to inspect an object, where "inspect" means to determine some information about the status of the object. In one example of this method, the status of an object includes whether or not the object satisfies inspection criteria chosen as appropriate by a user.

In some aspects of the Vision Detector Method and Apparatus dynamic image analysis is combined with visual event detection, so that the active frames chosen by the visual event detection method are the ones used by the dynamic image analysis method to inspect the object. In other aspects of the Vision Detector Method and Apparatus, the frames to be used by dynamic image analysis can be captured in response to a trigger signal.

Each such frame is analyzed to determine evidence that the object satisfies the inspection criteria. In one exemplary method, the evidence is in the form of a value, called an object pass score, that indicates a level of confidence that the object satisfies the inspection criteria. As with object detection weights, the value may be a simple yes/no choice that indicates high or low confidence, a number, such as a fuzzy logic value, that indicates a range of levels of confidence, or any item of information that conveys evidence.

The status of the object may be determined from statistics of the object pass scores, such as an average or percentile of the object pass scores. The status may also be determined by weighted statistics, such as a weighted average or weighted percentile, using the object detection weights. Weighted statistics effectively weight evidence more heavily from frames wherein the confidence is higher that the object is actually located in the field of view for that frame.

Evidence for object detection and inspection is obtained by examining a frame for information about one or more visible features of the object. A visible feature is a portion of the object wherein the amount, pattern, or other characteristic of emitted light conveys information about the presence, identity, or status of the object. Light can be emitted by any process or combination of processes, including but not limited to reflection, transmission, or refraction of a source external or internal to the object, or directly from a source internal to the object.

One aspect of the Vision Detector Method and Apparatus is a method for obtaining evidence, including object detection weights and object pass scores, by image analysis operations on one or more regions of interest in each frame for which the evidence is needed. In example of this method, the image analysis operation computes a measurement based on the pixel values in the region of interest, where the measurement is responsive to some appropriate characteristic of a visible feature of the object. The measurement is converted to a logic value by a threshold operation, and the logic values obtained from the regions of interest are combined to produce the evidence for the frame. The logic values can be binary or fuzzy logic values, with the thresholds and logical combination being binary or fuzzy as appropriate.

For visual event detection, evidence that an object is located in the field of view is effectively defined by the regions of interest, measurements, thresholds, logical combinations, and other parameters further described herein, which are collectively called the configuration of the vision detector and are chosen by a user as appropriate for a given application of the invention. Similarly, the configuration of the vision detector defines what constitutes sufficient evidence.

For dynamic image analysis, evidence that an object satisfies the inspection criteria is also effectively defined by the configuration of the vision detector.

Discussion of the Problem

Image analysis devices, including machine vision systems and vision detectors, must be configured to inspect objects. Typically, configuring such a device requires a human user to obtain at least one object whose appearance is representative of the objects to be inspected. The user captures an image of the object, generally called a training image, and uses it by choosing image analysis tools, positioning those tools on the training image, and setting operating parameters to achieve a desired effect. It is desirable that a training image be obtained under conditions as close to the actual production line as is practical. For production lines that operate in continuous motion, however, this can present difficulties for conventional vision systems. Generally a trigger signal must be used to obtain a useful training image, with the attendant limitations of triggers mentioned above. Furthermore, the single image captured in response to the trigger may not be the best viewing perspective from which to obtain the training image.

During configuration, a vision detector must be tested to determine whether its performance meets the requirements of the application. If the performance meets the requirements, the configuration can be considered complete, otherwise adjustments must be made. Since no vision detector makes perfect inspection decisions, testing performance generally includes some assessment of the probability that a correct decision will be made as to the status (e.g., pass or fail) of an object. Furthermore, since the error rates (incorrect decisions) are very low (desirably under one in 10,000 objects) this assessment can be very difficult. Therefore it is desirable that a large number of objects be tested, and that only those likely to represent incorrect decisions be assessed by the human user.

SUMMARY OF THE INVENTION

In one aspect the invention provides systems and methods for configuring a vision detector, wherein a training image is obtained from a production line operating in continuous motion so as to provide conditions substantially identical to those that will apply during actual manufacturing and inspection of objects. A training image can be obtained without any need for a trigger signal, whether or not the vision detector might use such a signal for inspecting the objects.

The production line contains a plurality of objects in continuous motion and passing through the field of view of a vision detector, which captures a sequence of images of the field of view. The frame rate is sufficiently high that a plurality of images are captured for each object as it passes through the field of view, and the sequence is sufficiently long that it contains images for a plurality of objects. The sequence of images will thus include a variety of viewing perspectives of each of a variety of objects, and will typically also include images where no object is present in the field of view, or where an object is only partially present.

Images from the captured sequence of images are displayed for a human user who will configure the vision detector. Typically it is not practical to display all of the captured images at once at a display resolution sufficient for the user to see useful detail in each image, so instead a portion of the sequence is displayed at one time. The user chooses the portion to be displayed by issuing scrolling commands to advance the portion to be displayed forward or backward in the sequence. The portion to be displayed at one time preferably includes several images, but can include as few as one image.

The user issues scrolling commands to advance the displayed portion forward and/or backward in the sequence until an image is found that the user judges to be sufficiently similar in appearance to the typical objects that will be inspected by the vision detector. The user will choose this image to be a training image. Since multiple images of each of multiple objects have been captured, the user will have a choice both of which object, and which viewing perspective (i.e. position in the field of view), he prefers to use for the training image.

The user will configure the vision detector by creating and configuring at least one vision tool, where a vision tool performs a suitable image analysis operation on a region of interest in frames that the vision detector will capture and analyze during the course of detecting and inspecting objects. Vision tools are created and configured using the chosen training image to perform actions including choosing the type of vision tool to create, to insure that the vision tool is capable of inspecting objects similar in appearance to the training image;

choosing the location, size, and/or orientation of the region of interest relative to the field of view; and setting operating parameters of the vision tool so that desirable results are obtained.

In an exemplary embodiment, the images are displayed using a graphical user interface (GUI). The portion of images displayed at one time are contained in a filmstrip window of the GUI, which displays the portion of images as a succession of low-resolution "thumbnail" images. The resolution of the thumbnail images is chosen to be low enough that a useful number of images can been seen at one time, and high enough that each image is sufficiently detailed to be useful. The scrolling commands are provided by conventional GUI elements.

This exemplary embodiment further displays one image of the portion of images at full resolution in an image view window. As the scrolling commands advance the filmstrip forward and/or backward, the image displayed in the image view window will also be advanced forward or backward. The image view window may also contain a graphical display of any vision tools created by the user.

In a further modification to this exemplary embodiment, the captured sequence of images are stored in a memory on the vision detector, and the GUI is running on a separate human-machine interface (HMI) connected to the vision detector by means of a communications interface. To avoid excessive time that might be needed to transmit the entire captured sequence of images to the HMI, the vision detector creates and transmits the low-resolution thumbnail images for display in the filmstrip window. Only at such times as a new full-resolution image is needed by the HMI for display in the image view window is the appropriate full-resolution image transmitted.

In another exemplary embodiment, a configuration of the vision detector can be improved using additional images in the captured sequence of images. Note that there is no requirement or expectation that only one training image be used to configure a vision detector. It is desirable to confirm reasonable operation of the vision detector for a variety of viewing perspectives of a variety of objects, and to adjust the configuration as necessary to achieve that.

Furthermore, while at least one training image should be chosen to be sufficiently similar in appearance to the typical objects that will be inspected by the vision detector, it is often desirable to choose other training images that are not similar, as long as they are obtained under conditions as close to the actual production line as is practical. These other training images might include the images where no object is present in the field of view, or where an object is only partially present, for which it is desirable that the configuration of the vision detector be such that an object is not falsely detected.

It is expressly contemplated that the above described aspect of the invention could be used for configuring a prior art machine vision system that operates at a frame rate sufficiently high relative to the speed of the production line that a plurality of images are captured for each object.

In another aspect the invention provides systems and methods for testing a vision detector by capturing and storing selected images during a production run for display to a human user. As noted in the Background section, is desirable that a large number of objects be tested, which would produce far more images than would be practical for a human user to review. Therefore the invention provides systems and methods to select, store, and display a limited number of images from a production run, where those images correspond to objects likely to represent incorrect decisions.

The production line contains a plurality of objects in continuous motion and passing through the field of view of a vision detector, which captures and analyzes a sequence of frames. The vision detector has previously been configured to detect and inspect the objects. The detection may use a trigger signal or visual event detection, as further described herein and in the Vision Detector Method and Apparatus. The inspection preferably uses dynamic image analysis, as further described herein and in the Vision Detector Method and Apparatus, but may use any means that produces information about the status of objects.

A group of frames from the sequence of frames corresponds to each object detected and inspected. When using visual event detection, the group of frames may include the active frames, and may also include inactive frames sandwiched between the active frames or terminating the set of active frames. In an exemplary embodiment, the group of frames includes the active frames and all inactive frames sandwiched between them. When using a trigger signal, the group of frames preferably includes all of the frames captured and analyzed responsive to the trigger.

Each object is inspected, resulting in information about the status of the object. This result information may include a simple pass/fail, and it may also include statistics of frame counts, object detection weights, or object pass scores calculated during the course of detecting and inspecting the object and further described herein and in the Vision Detector Method and Apparatus.

The result information for each object is used to decide whether to store the object's group of frames for subsequent display to a human user. Typically it is not practical to display all of the stored images at once at a display resolution sufficient for the user to see useful detail in each image, so instead a portion of the stored images are displayed at one time. The user chooses the portion to be displayed by issuing scrolling commands to advance the portion to be displayed forward or backward, either by individual images within a group or by groups. The portion to be displayed at one time preferably includes several images, but can include as few as one image.

The choice of which groups to store is preferably made by the human user prior to the production run. The user may choose to store all groups, just those groups corresponding to objects that pass inspection, or just those groups corresponding to objects that fail inspection. These choices are often useful, but do not meet the objective of storing images that correspond to objects likely to represent incorrect decisions.

To meet that objective the invention recognizes that pass/fail decisions are preferably made by comparing a number to a decision threshold, where the number represents a level of confidence that some condition holds, for example that an object has been detected or that it passes inspection. The number is included in the object's result information and may correspond to statistics of frame counts, object detection weights, or object pass scores calculated during the course of detecting and inspecting the object.

If the number is significantly above the decision threshold, one can be confident that the condition holds; if significantly below the decision threshold, one can be confident that the condition does not hold. If the number is close to the decision threshold, however, the decision is ambiguous and one cannot be confident in the outcome. Thus objects for which the number is close to the decision threshold are likely to represent incorrect decisions, and it is desirable to store the corresponding groups of frames.

In an exemplary embodiment, the images are displayed using a GUI. The portion of images displayed at one time are contained in a filmstrip window of the GUI, which displays the portion of images as a succession of low-resolution "thumbnail" images. The resolution of the thumbnail images is chosen to be low enough that a useful number of images can been seen at one time, and high enough that each image is sufficiently detailed to be useful. The scrolling commands are provided by conventional GUI elements.

This exemplary embodiment further displays one image of the portion of images at full resolution in an image view window. As the scrolling commands advance the filmstrip forward and/or backward, the image displayed in the image view window will also be advanced forward or backward. The image view window may also contain a graphical display of any vision tools that are part of the configuration of the vision detector.

In a further modification to this exemplary embodiment, the GUI is running on a separate HMI connected to the vision detector by means of a communications interface. To avoid excessive time that might be needed to transmit all of the stored images to the HMI, the vision detector creates and transmits the low-resolution thumbnail images for display in the filmstrip window. Only at such times as when a new full-resolution image is needed by the HMI for display in the image view window is the appropriate full-resolution image transmitted.

BRIEF DESCRIPTION OF THE DRAWINGS

The invention will be more fully understood from the following detailed description, in conjunction with the accompanying figures, wherein.

DETAILED DESCRIPTION OF THE INVENTION

Basic Operation of the Vision Detector Method and Apparatus

Figure 1:
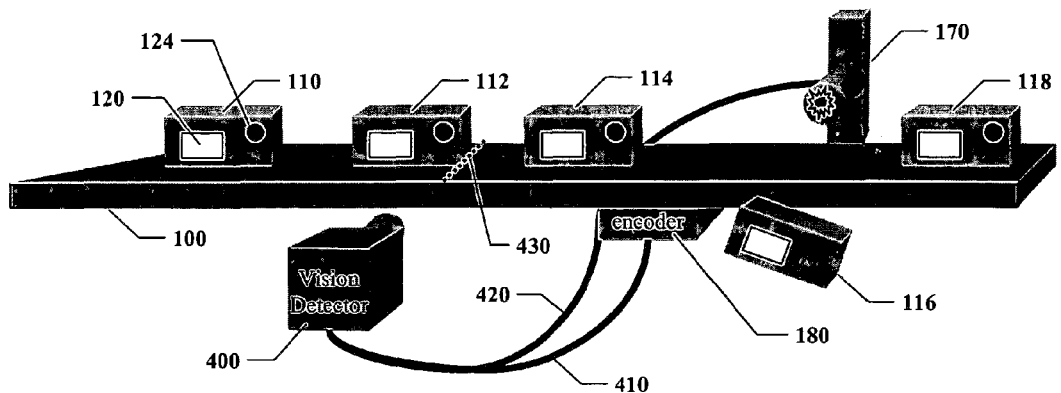
FIG. 1 shows an illustrative embodiment of a vision detector according to the Vision Detector Method and Apparatus, inspecting objects on a production line.

FIG. 1 shows an illustrative embodiment of a vision detector according to the Vision Detector Method and Apparatus, inspecting objects on a production line. A conveyer 100 transports objects to cause relative movement between the objects and the field of view of vision detector 400. Objects 110, 112, 114, 116, and 118 move left to right on a conveyer 100. Each object is expected to contain certain features, for example a label 120 and a hole 124. Objects incorrectly manufactured may be missing one or more features, or may have unintended features; for example, object 116 is missing the hole. On many production lines motion of the conveyer is tracked by a shaft encoder 180. A vision detector 400 detects the presence of an object by visual appearance and inspects it based on appropriate inspection criteria. If an object is defective, the vision detector sends signal 420 to reject actuator 170 to remove the object from the conveyer stream. The encoder 180 sends signal 410 to the vision detector, which uses it to insure proper delay of signal 420 from the encoder count where the object crosses some fixed, imaginary reference point 430, called the mark point. If an encoder is not used, the delay can be based on time instead.

In an alternate embodiment, the vision detector sends signals to a PLC for various purposes, which may include controlling a reject actuator.

In another embodiment, suitable in extremely high speed applications or where the vision detector cannot reliably detect the presence of an object, a photodetector is used to detect the presence of an object and sends a signal to the vision detector for that purpose.

In yet another embodiment there are no discrete objects, but rather material flows past the vision detector continuously, for example a web. In this case the material is inspected continuously, and signals are send by the vision detector to automation equipment, such as a PLC, as appropriate.

When a vision detector detects the presence of discrete objects by visual appearance, it is said to be operating in visual event detection mode. When a vision detector detects the presence of discrete objects using an external signal such as from a photodetector, it is said to be operating in external trigger mode. When a vision detector continuously inspects material, it is said to be operating in continuous analysis mode.

Figure 2:
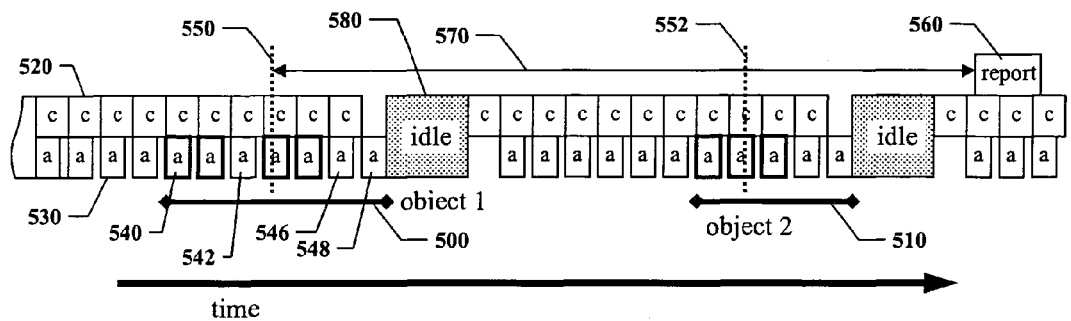
FIG. 2 shows a timeline that illustrates a typical operating cycle for a vision detector using visual event detection.

FIG. 2 shows a timeline that illustrates a typical operating cycle for a vision detector in visual event detection mode. Boxes labeled "c", such as box 520, represent image capture. Boxes labeled "a", such as box 530, represent image analysis. It is desirable that capture "c" of the next image be overlapped with analysis "a" of the current image, so that (for example) analysis step 530 analyzes the image captured in capture step 520. In this timeline, analysis is shown as taking less time than capture, but in general analysis will be shorter or longer than capture depending on the application details.

If capture and analysis are overlapped, the rate at which a vision detector can capture and analyze images is determined by the longer of the capture time and the analysis time. This is the "frame rate".

The Vision Detector Method and Apparatus allows objects to be detected reliably without a trigger signal, such as that provided by a photodetector. Referring to FIG. 1, there is no trigger signal to indicate the presence of an object, and in FIG. 2 there is no corresponding trigger step.

Referring again to FIG. 2, a portion 500 of the timeline corresponds to the inspection of a first object, and contains the capture and analysis of seven frames. A second portion 510 corresponds to the inspection of a second object, and contains five frames.

Each analysis step first considers the evidence that an object is present. Frames where the evidence is sufficient are called active. Analysis steps for active frames are shown with a thick border, for example analysis step 540. In an illustrative embodiment, inspection of an object begins when an active frame is found, and ends when some number of consecutive inactive frames are found. In the example of FIG. 2, inspection of the first object begins with the first active frame corresponding to analysis step 540, and ends with two consecutive inactive frames, corresponding to analysis steps 546 and 548. Note that for the first object, a single inactive frame corresponding to analysis step 542 is not sufficient to terminate the inspection.

At the time that inspection of an object is complete, for example at the end of analysis step 548, decisions are made on the status of the object based on the evidence obtained from the active frames. In an illustrative embodiment, if an insufficient number of active frames were found then there is considered to be insufficient evidence that an object was actually present, and so operation continues as if no active frames were found. Otherwise an object is judged to have been detected, and evidence from the active frames is judged in order to determine its status, for example pass or fail. A variety of methods may be used to detect objects and determine status within the scope of the Vision Detector Method and Apparatus; some are described below and many others will occur to those skilled in the art.

Once an object has been detected and a judgment made, a report may be made to appropriate automation equipment, such as a PLC, using signals well-known in the art. In such a case a report step would appear in the timeline. The example of FIG. 2 corresponds instead to a setup such as shown in FIG. 1, where the vision detector is used to control a downstream reject actuator 170 via signal 420. By considering the position of the object in the active frames as it passes through the field of view, the vision detector estimates the mark time 550 and 552 at which the object crosses the mark point 430. Note that in cases where an encoder 180 is used, the mark time is actually an encoder count; the reader will understand that time and count can be used interchangeably. A report 560, consisting of a pulse of appropriate duration to the reject actuator 170, is issued after a precise delay 570 in time or encoder count from the mark time 550.

Note that the report 560 may be delayed well beyond the inspection of subsequent objects such as 510. The vision detector uses well-known first-in first-out (FIFO) buffer methods to hold the reports until the appropriate time.

Once inspection of an object is complete, the vision detector may enter an idle step 580. Such a step is optional, but may be desirable for several reasons. If the maximum object rate is known, there is no need to be looking for an object until just before a new one is due. An idle step will eliminate the chance of false object detection at times when an object couldn't arrive, and will extend the lifetime of the illumination system because the lights can be kept off during the idle step.

Figure 3:
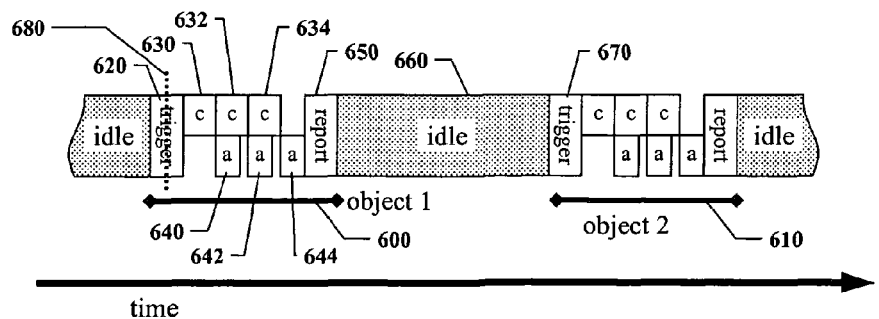
FIG. 3 shows a timeline that illustrates a typical operating cycle for a vision detector using a trigger signal.

FIG. 3 shows a timeline that illustrates a typical operating cycle for a vision detector in external trigger mode. A trigger step 620 begins inspection of a first object 600. A sequence of image capture steps 630, 632, and 634, and corresponding analysis steps 640, 642, and 644 are used for dynamic image analysis. As in visual event detection mode, it is desirable that the frame rate be sufficiently high that the object moves a small fraction of the field of view between successive frames, often no more than a few pixels per frame. After a fixed number of frames, the number being chosen based on application details, the evidence obtained from analysis of the frames is used to make a final judgment on the status of the object, which in one embodiment is provided to automation equipment in a report step 650. Following the report step, an idle step 660 is entered until the next trigger step 670 that begins inspection of a second object 610.

In another embodiment, the report step is delayed in a manner equivalent to that shown in FIG. 2. In this embodiment, the mark time 680 is the time (or encoder count) corresponding to the trigger step 620.

Illustrative Apparatus

Figure 4:
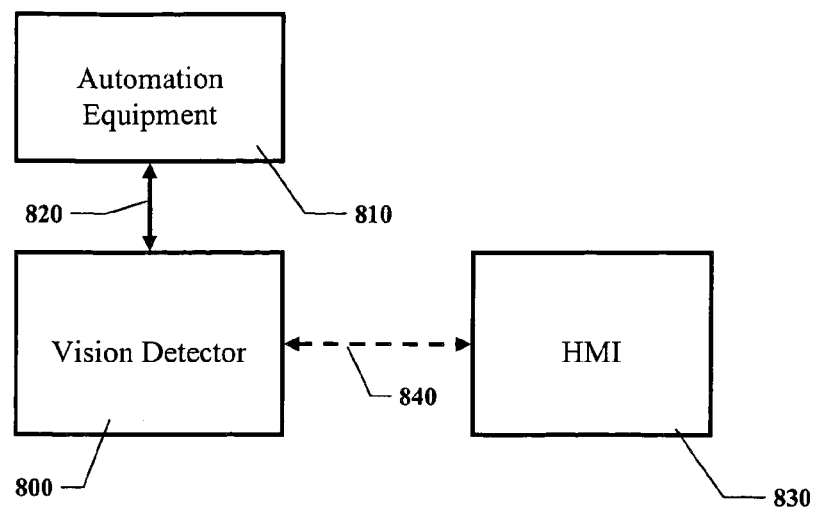
FIG. 4 shows a high-level block diagram for a vision detector in a production environment.

FIG. 4 shows a high-level block diagram for a vision detector in a production environment. A vision detector 800 is connected to appropriate automation equipment 810, which may include PLCs, reject actuators, and/or photodetectors, by means of signals 820. The vision detector may also be connected to a human-machine interface (HMI) 830, such as a PC or hand-held device, by means of communications interface 840. The HMI is used for setup and monitoring, and may be removed during normal production use. The signals can be implemented in any acceptable format and/or protocol and transmitted in a wired or wireless form.

Figure 5:
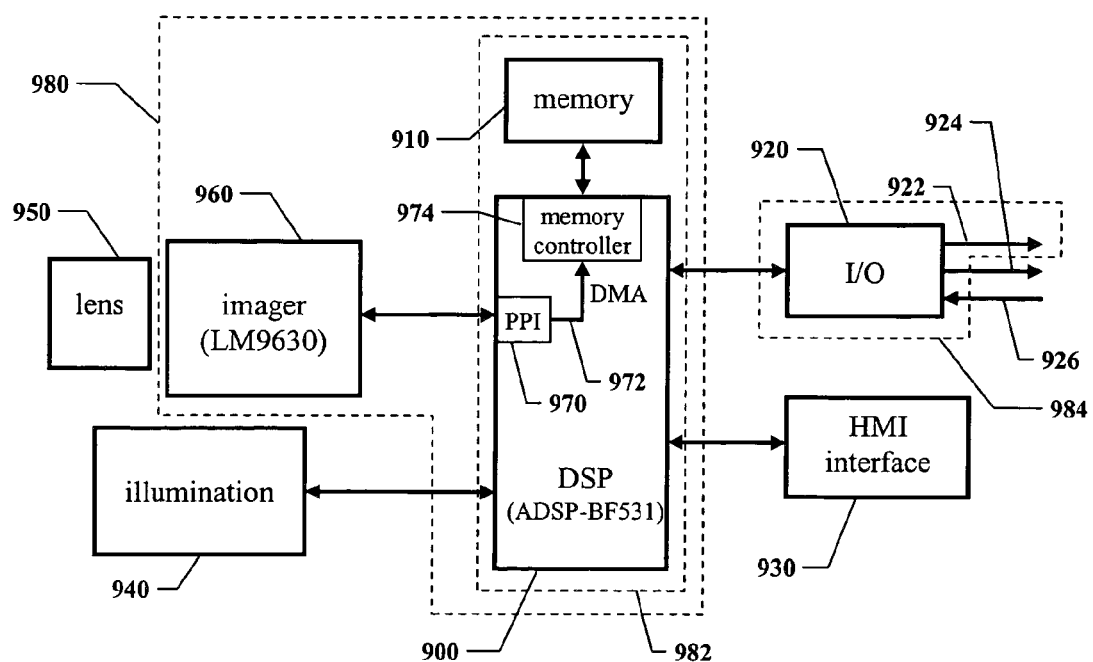
FIG. 5 shows a block diagram of an illustrative embodiment of a vision detector.

FIG. 5 shows a block diagram of an illustrative embodiment of a vision detector. A digital signal processor (DSP) 900 runs software to control capture, analysis, reporting, HMI communications, and any other appropriate functions needed by the vision detector. The DSP 900 is interfaced to a memory 910, which includes high speed random access memory for programs and data and non-volatile memory to hold programs and setup information when power is removed. The DSP is also connected to an I/O module 920 that provides signals to automation equipment, an HMI interface 930, an illumination module 940, and an imager 960. A lens 950 focuses images onto the photosensitive elements of the imager 960.

The DSP 900 can be any device capable of digital computation, information storage, and interface to other digital elements, including but not limited to a general-purpose computer, a PLC, or a microprocessor. It is desirable that the DSP 900 be inexpensive but fast enough to handle a high frame rate. It is further desirable that it be capable of receiving and storing pixel data from the imager simultaneously with image analysis.

In the illustrative embodiment of FIG. 5, the DSP 900 is an ADSP-BF531 manufactured by Analog Devices of Norwood, Mass. The Parallel Peripheral Interface (PPI) 970 of the ADSP-BF531 DSP 900 receives pixel data from the imager 960, and sends the data to memory controller 974 via Direct Memory Access (DMA) channel 972 for storage in memory 910. The use of the PPI 970 and DMA 972 allows, under appropriate software control, image capture to occur simultaneously with any other analysis performed by the DSP 900. Software instructions to control the PPI 970 and DMA 972 can be implemented by one of ordinary skill in the art following the programming instructions contained in the ADSP-BF533 Blackfin Processor Hardware Reference (part number 82-002005-01), and the Blackfin Processor Instruction Set Reference (part number 82-000410-14), both incorporated herein by reference. Note that the ADSP-BF531, and the compatible ADSP-BF532 and ADSP-BF533 devices, have identical programming instructions and can be used interchangeably in this illustrative embodiment to obtain an appropriate price/performance tradeoff.

The high frame rate desired by a vision detector suggests the use of an imager unlike those that have been used in prior art vision systems. It is desirable that the imager be unusually light sensitive, so that it can operate with extremely short shutter times using inexpensive illumination. It is further desirable that it be able to digitize and transmit pixel data to the DSP far faster than prior art vision systems. It is moreover desirable that it be inexpensive and have a global shutter.

These objectives may be met by choosing an imager with much higher light sensitivity and lower resolution than those used by prior art vision systems. In the illustrative embodiment of FIG. 5, the imager 960 is an LM9630 manufactured by National Semiconductor of Santa Clara, Calif. The LM9630 has an array of 128 by 100 pixels, for a total of 12800, about 24 times fewer than typical prior art vision systems. The pixels are relatively large at 20 microns square, providing high light sensitivity. The LM9630 can provide 500 frames per second when set for a 300 microsecond shutter time, and is sensitive enough (in most cases) to allow a 300 microsecond shutter using LED illumination. This resolution would be considered far too low for a vision system, but is quite sufficient for the feature detection tasks that are the objectives of the Vision Detector Method and Apparatus. Electrical interface and software control of the LM9630 can be implemented by one of ordinary skill in the art following the instructions contained in the LM9630 Data Sheet, Rev 1.0, January 2004, which is incorporated herein by reference.

It is desirable that the illumination 940 be inexpensive and yet bright enough to allow short shutter times. In an illustrative embodiment, a bank of high-intensity red LEDs operating at 630 nanometers is used, for example the HLMP-ED25 manufactured by Agilent Technologies. In another embodiment, high-intensity white LEDs are used to implement desired illumination.

In the illustrative embodiment of FIG. 5, the I/O module 920 provides output signals 922 and 924, and input signal 926. One such output signal can be used to provide signal 420 (FIG. 1) for control of reject actuator 170. Input signal 926 can be used to provide an external trigger.

As used herein an image capture device provides means to capture and store a digital image. In the illustrative embodiment of FIG. 5, image capture device 980 comprises a DSP 900, imager 960, memory 910, and associated electrical interfaces and software instructions.

As used herein an analyzer provides means for analysis of digital data, including but not limited to a digital image. In the illustrative embodiment of FIG. 5, analyzer 982 comprises a DSP 900, a memory 910, and associated electrical interfaces and software instructions.

As used herein an output signaler provides means to produce an output signal responsive to an analysis. In the illustrative embodiment of FIG. 5, output signaler 984 comprises an I/O module 920 and an output signal 922.

It will be understood by one of ordinary skill that there are many alternate arrangements, devices, and software instructions that could be used within the scope of the Vision Detector Method and Apparatus to implement an image capture device 980, analyzer 982, and output signaler 984.

A variety of engineering tradeoffs can be made to provide efficient operation of an apparatus according to the Vision Detector Method and Apparatus for a specific application. Consider the following definitions:

b fraction of the FOV occupied by the portion of the object that contains the visible features to be inspected, determined by choosing the optical magnification of the lens 950 so as to achieve good use of the available resolution of imager 960;

e fraction of the FOV to be used as a margin of error;

n desired minimum number of frames in which each object will typically be seen;

s spacing between objects as a multiple of the FOV, generally determined by manufacturing conditions;

p object presentation rate, generally determined by manufacturing conditions;

m maximum fraction of the FOV that the object will move between successive frames, chosen based on above values; and r minimum frame rate, chosen based on above values.

From these definitions it can be seen that $$m \leq \frac{1-b-e}{n} \quad (1)$$

and $$r \geq \frac{sp}{m} \quad (2)$$

To achieve good use of the available resolution of the imager, it is desirable that b is at least 50%. For dynamic image analysis, n should be at least 2. Therefore it is further desirable that the object moves no more than about one-quarter of the field of view between successive frames.

In an illustrative embodiment, reasonable values might be b=75%, e=5%, and n=4. This implies that m≤5%, i.e. that one would choose a frame rate so that an object would move no more than about 5% of the FOV between frames. If manufacturing conditions were such that s=2, then the frame rate r would need to be at least approximately 40 times the object presentation rate p. To handle an object presentation rate of 5 Hz, which is fairly typical of industrial manufacturing, the desired frame rate would be at least around 200 Hz. This rate could be achieved using an LM9630 with at most a 3.3 millisecond shutter time, as long as the image analysis is arranged so as to fit within the 5 millisecond frame period. Using available technology, it would be feasible to achieve this rate using an imager containing up to about 40,000 pixels.

With the same illustrative embodiment and a higher object presentation rate of 12.5 Hz, the desired frame rate would be at least approximately 500 Hz. An LM9630 could handle this rate by using at most a 300 microsecond shutter.

In another illustrative embodiment, one might choose b=75%, e=15%, and n=5, so that m≤2%. With s=2 and p=5 Hz, the desired frame rate would again be at least approximately 500 Hz.

Fuzzy Logic Decision Making

Figure 6:
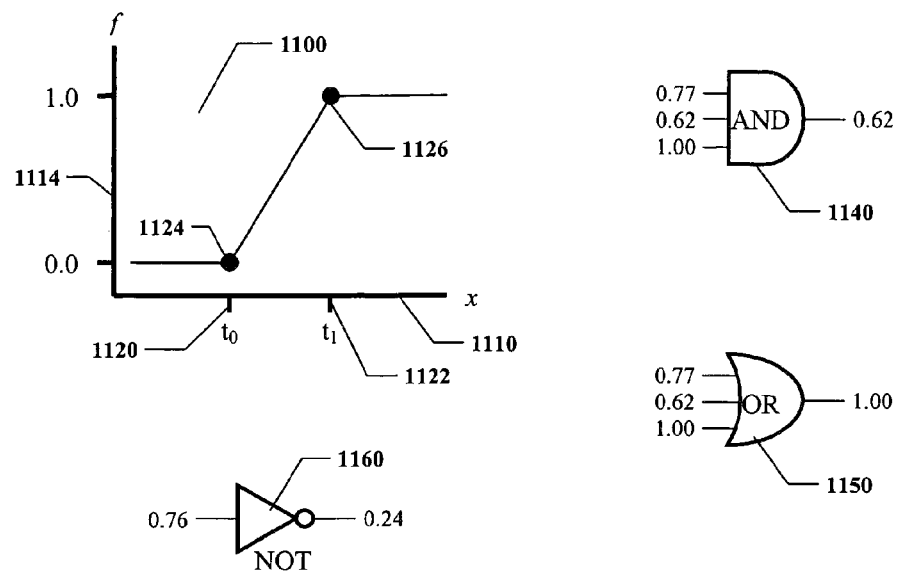
FIG. 6 shows fuzzy logic elements used in an illustrative embodiment to weigh evidence and make judgments, including judging whether an object is present and whether it passes inspection.

FIG. 6 shows fuzzy logic elements used in an illustrative embodiment to weigh evidence and make judgments, including judging whether an object is present and whether it passes inspection.

A fuzzy logic value is a number between 0 and 1 that represents an estimate of confidence that some specific condition is true. A value of 1 signifies high confidence that the condition is true, 0 signifies high confidence that the condition is false, and intermediate values signify intermediate levels of confidence.

The more familiar binary logic is a subset of fuzzy logic, where the confidence values are restricted to just 0 and 1. Therefore, any embodiment described herein that uses fuzzy logic values can use as an alternative binary logic values, with any fuzzy logic method or apparatus using those values replaced with an equivalent binary logic method or apparatus.

Just as binary logic values are obtained from raw measurements by using a threshold, fuzzy logic values are obtained using a fuzzy threshold. Referring to FIG. 6, a graph 1100 illustrates a fuzzy threshold. The x-axis 1110 represents a raw measurement, and the f-axis 1114 represents the fuzzy logic value, which is a function whose domain includes all possible raw measurements and whose range is 0≤f≤1.

In an illustrative embodiment, a fuzzy threshold comprises two numbers shown on the x-axis, low threshold $t_0$ 1120, and high threshold $t_1$ 1122, corresponding to points on the function 1124 and 1126. The fuzzy threshold can be defined by the equation $$f = \min\left(\max\left(\frac{x-t_0}{t_1-t_0}, 0\right), 1\right) \quad (3)$$

Note that this function works just as well when $t_1 < t_0$. Other functions can also be used for a fuzzy threshold, such as the sigmoid $$f = \frac{1}{1+e^{-(x-t)/\sigma}} \quad (4)$$

where t and σ are threshold parameters. In embodiments where simplicity is a goal, a conventional binary threshold can be used, resulting in binary logic values.

Fuzzy decision making is based on fuzzy versions of AND 1140, OR 1150, and NOT 1160. A fuzzy AND of two or more fuzzy logic values is the minimum value, and a fuzzy OR is the maximum value. Fuzzy NOT of f is 1−f Fuzzy logic is identical to binary when the fuzzy logic values are restricted to 0 and 1.

In an illustrative embodiment, whenever a hard true/false decision is needed, a fuzzy logic value is considered true if it is at least 0.5, false if it is less than 0.5.

It will be clear to one skilled in the art that there is nothing critical about the values 0 and 1 as used in connection with fuzzy logic herein. Any number could be used to represent high confidence that a condition is true, and any different number could be used to represent high confidence that the condition is false, with intermediate values representing intermediate levels of confidence.

Dynamic Image Analysis

Figure 7:
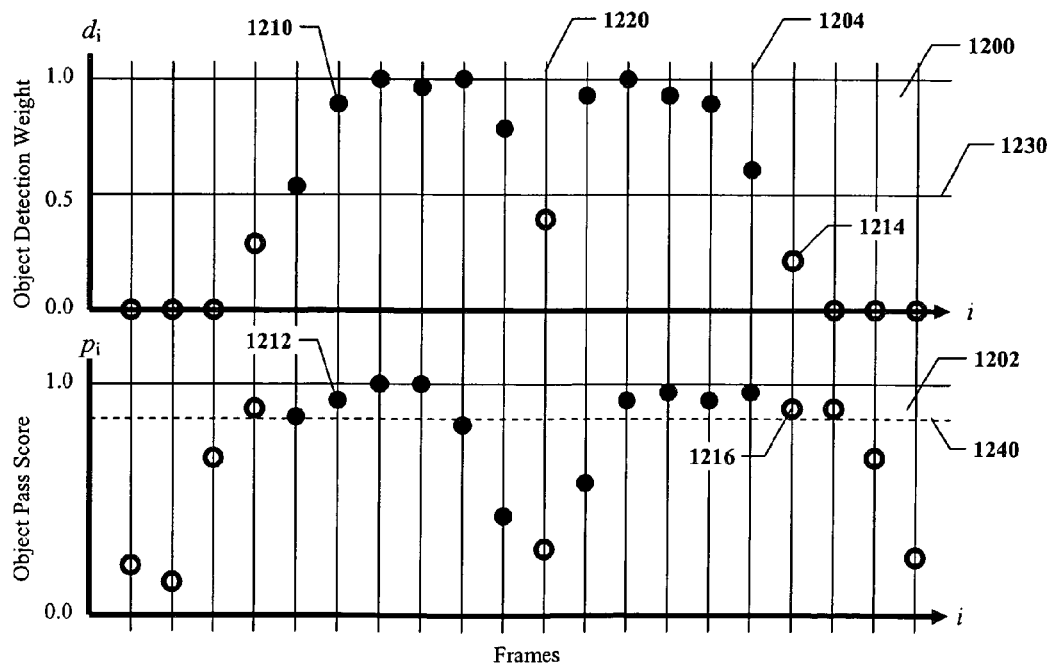
FIG. 7 illustrates how evidence is weighed for dynamic image analysis in an illustrative embodiment.

FIG. 7 illustrates how evidence is weighed for dynamic image analysis in an illustrative embodiment. In this embodiment two decisions, called the primary decisions, must be made:

1. Is an object, or a set of visible features of an object, located in the field of view?

2. If so, what is the status of the object?

Information comprising evidence that an object is located in the field of view is called an object detection weight. Information comprising evidence regarding the status of an object is called an object pass score. In various illustrative embodiments, the status of the object comprises whether or not the object satisfies inspection criteria chosen as appropriate by a user. In the following, an object that satisfies the inspection criteria is sometimes said to "pass inspection".

FIG. 7 shows two plots, object detection plot 1200 and object pass plot 1202. The horizontal axes of the two plots represent a frame sequence number i; each frame is represented by a vertical line, such as example line 1204.

In the illustrative embodiment of FIG. 7, object detection weights are fuzzy logic values $d_i$, representing evidence that an object is located in the FOV in frame i, and are computed by the vision detector on each frame using methods further described below and in the Vision Detector Method and Apparatus. Object pass scores are fuzzy logic values $p_i$, representing evidence that an object satisfies appropriate inspection criteria in frame i, and are computed by the vision detector on selected frames using methods further described below and in the Vision Detector Method and Apparatus. The vertical axis of object detection plot 1200 represents $d_i$, and the vertical axis of object pass plot 1202 represents $p_i$.

In the illustrative embodiment of FIG. 7, frames where $d_i \geq 0.5$ are considered active (refer to the above description of FIG. 2 for an explanation of active frames). For reference, a line 1230 where $d_i=0.5$ is plotted. Object detection weights and pass scores for active frames are plotted as solid circles, for example points 1210 and 1212, and those for inactive frames are plotted as open circles, for example points 1214 and 1216. In some embodiments, the object pass weights are only computed for active frames; while in the embodiment of FIG. 7, they are computed for all frames, whether or not deemed "active".

In the example of FIG. 7, all of the active frames correspond to the inspection of a single object; as explained in the above description of FIG. 2, the isolated inactive frame 1220 does not terminate the inspection.

In one embodiment, an object is judged to have been detected if the number of active frames found exceeds some threshold. An another embodiment, an object is judged to have been detected if the total object detection weight over all active frames exceeds some threshold. These thresholds are set as appropriate for a given application.

In the illustrative embodiment of FIG. 7, an object is judged to pass inspection if the weighted average of the object pass scores, each weighted by the corresponding object detection weight, is at least 0.5. More precisely, the object passes inspection if $$\frac{\sum_i d_i p_1}{\sum_i d_i} \geq 0.5 \quad (5)$$

where the summation is over all active frames. The effect of this formula is to average the object pass scores, but to weight each score based on the confidence that the object really did appear in the corresponding frame.

In an alternate embodiment, an object is judged to pass inspection if the average of the object pass scores is at least 0.5. This is equivalent to a weighted average wherein all of the weights are equal.

In the example of FIG. 7, the weighted average pass score is around 0.86, which is plotted as line 1240. The number of active frames is 11, and the total object detection weight is around 9.5. In this example an object is detected and passes inspection.

Figure 8:
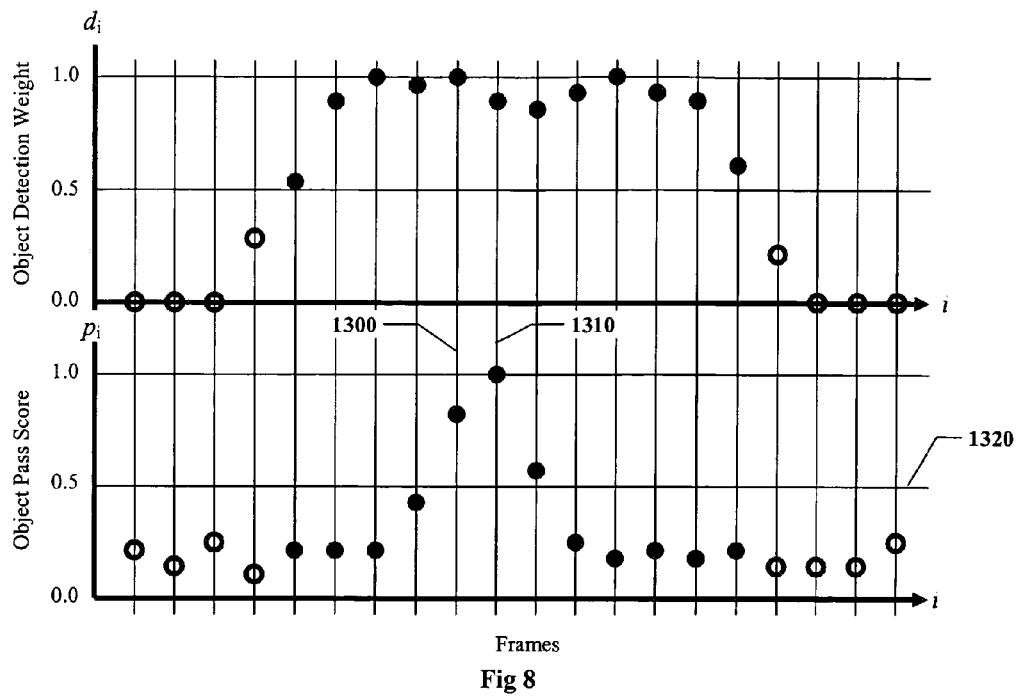
FIG. 8 illustrates how evidence is weighed for dynamic image analysis in another illustrative embodiment.

FIG. 8 illustrates how evidence is weighed for dynamic image analysis in another illustrative embodiment. In this example, object features being inspected are difficult to see and only appear with confidence in a small number of the active frames, primarily frames 1300 and 1310, when the viewing and illumination perspective is just right as the object moves through the field of view. As long as the evidence is sufficient in these few frames that the features are present, the object should pass inspection. In this scenario, there is no way to know in advance which of the active frames will contain this evidence. Thus, weighted average pass score is not appropriate in this case. An alternative is to pass the object if the pass score exceeds some threshold in any of the active frames, but this alternative may pass objects on the basis of too little evidence. In the illustrative embodiment of FIG. 8, a weighted percentile method is used.

The weighted percentile method is based on the fraction Q(p) of total weight where the pass score is at least p:

$$Q(p) = \frac{k \mid \sum_{p_k \geq p} d_k}{\sum_i d_i} \quad (6)$$

The object is judged to pass if Q(p) is at least some threshold t. In the illustrative embodiment of FIG. 8, p=0.5, which is plotted as line 1320. A reasonable threshold t for this case would be 10%.

Useful behavior is obtained using different values of t. For example, if t=50%, the object is judged to pass inspection if the weighted median score is at least p. Weighted median is similar to weighted average, but with properties more appropriate in some cases. For higher values, for example t=90%, the object will be judged to pass inspection only if the overwhelming majority of the weight corresponds to active frames where the pass score is at least p. For t=100%, the object will be judged to pass inspection only if all of the active frames have a pass score that is at least p. The object may also be judged to pass inspection if Q(p) is greater than 0, which means that any active frame has frame a pass score that is at least p.

In another useful variation, the object is judged to pass inspection based on the total weight where the pass score is at least p, instead of the fraction of total weight.

In an alternate embodiment, a percentile method is used based on a count of the frames where the pass score is at least p. This is equivalent to a weighted percentile method wherein all of the weights are equal.

The above descriptions of methods for weighing evidence to determine whether an object has been detected, and whether it passes inspection, are intended as examples of useful embodiments, but do not limit the methods that can be used within the scope of the Vision Detector Method and Apparatus. For example, the exemplary constants 0.5 used above may be replaced with any suitable value. Many additional methods for dynamic image analysis will occur to those skilled in the art.

Software Elements of the Vision Detector Method and Apparatus

Figure 9:
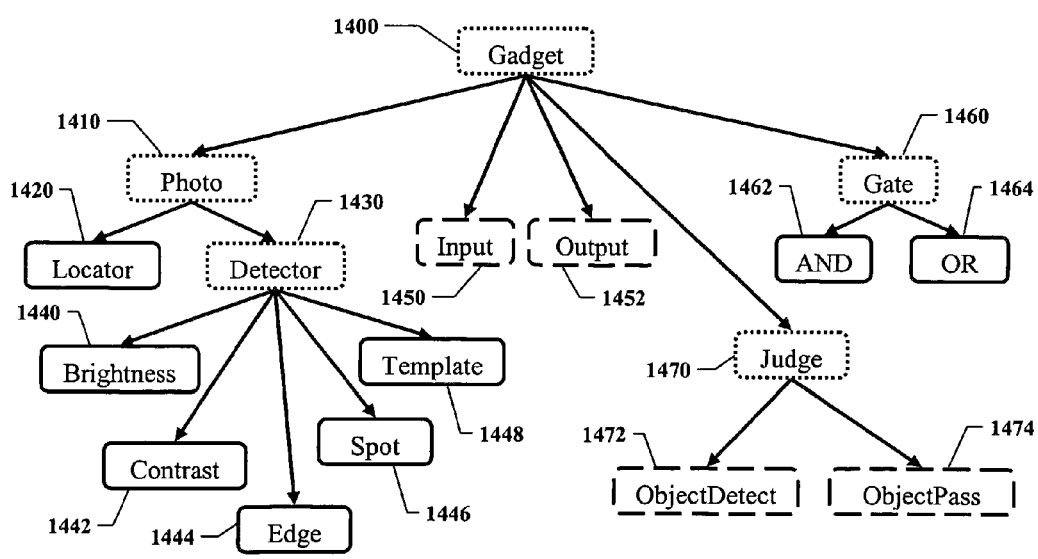
FIG. 9 shows the organization of a set of software elements (e.g., program instructions of a computer readable medium) used by an illustrative embodiment to analyze frames, make judgments, sense inputs, and control output signals.

FIG. 9 shows the organization of a set of software elements (e.g., program instructions of a computer readable medium) used by an illustrative embodiment to analyze frames, make judgments, sense inputs, and control output signals. The elements may be implemented using a class hierarchy in a conventional object-oriented programming language such as C++, so that each of the elements corresponds to a class. However, any acceptable programming technique and/or language can be used to carry out the processes described herein.

As illustrated, classes with a dotted border, such as Gadget class 1400, are abstract base classes that do not exist by themselves but are used to build concrete derived classes such as Locator class 1420. Classes with a solid border represent dynamic objects that can be created and destroyed as needed by the user in setting up an application, using an HMI 830. Classes with a dashed border, such as Input class 1450, represent static objects associated with specific hardware or software resources. Static objects always exist and cannot be created or destroyed by the user.

All classes are derived from Gadget class 1400, and so all objects that are instances of the classes shown in FIG. 9 are a kind of Gadget. In an illustrative embodiment, every Gadget:
1. has a name that can be chosen by the user;
2. has a logic output (a fuzzy logic value) that can be used as a logic input by other gadgets to make judgments and control output signals;
3. has a set of parameters than can be configured by a user to specify its operation;
4. has one such parameter that can be used to invert the logic output (i.e. fuzzy NOT); and
5. can be run, which causes its logic output to be updated based on its parameters, logic inputs if any, and for certain Gadgets the contents of the current frame, and which may also cause side-effects such as the setting of an output signal.

The act of analyzing a frame consists of running each Gadget once, in an order determined to guarantee that all logic inputs to a Gadget have been updated before the Gadget is run. In some embodiments, a Gadget is not run during a frame where its logic output is not needed.

The Photo class 1410 is the base class for all Gadgets whose logic output depends on the contents of the current frame. These are the classes that actually do the image analysis. Every Photo measures some characteristic of a region of interest (ROI) of the current frame. The ROI corresponds to a visible feature on the object to be inspected. This measurement is called the Photo's analog output. The Photo's logic output is computed from the analog output by means of a fuzzy threshold, called the sensitivity threshold, that is among its set of parameters that can be configured by a user. The logic output of a Photo can be used to provide evidence to be used in making judgments.

The Detector class 1430 is the base class for Photos whose primary purpose is to make measurements in an ROI and provide evidence to be used in making judgments. In an illustrative embodiment all Detector ROIs are circles. A circular ROI simplifies the implementation because there is no need to deal with rotation, and having only one ROI shape simplifies what the user has to learn. Detector parameters include the position and diameter of the ROI.

A Brightness Detector 1440 measures a weighted average or percentile brightness in the ROI. A Contrast Detector 1442 measures contrast in the ROI. An Edge Detector 1444 measures the extent to which the ROI looks like an edge in a specific direction. A Spot Detector 1446 measures the extent to which the ROI looks like a round feature such as a hole. A Template Detector 1448 measures the extent to which the ROI looks like a pre-trained pattern selected by a user. The operation of the Detectors is further described below and in the Vision Detector Method and Apparatus.

The Locator class, 1420 represents Photos that have two primary purposes. The first is to produce a logic output that can provide evidence for making judgments, and in this they can be used like any Detector. The second is to determine the location of an object in the field of view of a vision detector, so that the position of the ROI of other Photos can be moved so as to track the position of the object. Any Locator can be used for either or both purposes.

In an illustrative embodiment, a Locator searches a one-dimensional range in a frame for an edge. The search direction is normal to the edge, and is among the parameters to be configured by the user. The analog output of a Locator is similar to that for an Edge Detector. Locators are further described in the Vision Detector Method and Apparatus.

The Input class 1450 represents input signals to the vision detector, such as an external trigger. The Output class 1452 represents output signals from the vision detector, such as might be used to control a reject actuator. There is one static instance of the Input class for each physical input, such as exemplary input signal 926 (FIG. 5), and one static instance of the Output class for each physical output, such as exemplary output signals 922 and 924.

The Gate base class 1460 implements fuzzy logic decision making. Each Gate has one or more logic inputs than can be connected to the logic outputs of other Gadgets. Each logic input can be inverted (fuzzy NOT) by means of a parameter that a user can configure. An AND Gate 1462 implements a fuzzy AND operation, and an OR Gate 1464 implements a fuzzy OR operation.

The Judge class 1470 is the base class for two static objects, the ObjectDetect Judge 1472 and the ObjectPass Judge 1474. Judges implement dynamic image analysis by weighing evidence over successive frames to make the primary decisions. Each Judge has a logic input to which a user connects the logic output of a Photo or, more typically, a Gate that provides a logical combination of Gadgets, usually Photos and other Gates.

The ObjectDetect Judge 1472 decides if an object has been detected, and the ObjectPass Judge 1474 decides if it passes inspection. The logic input to the ObjectDetect Judge provides the object detection weight for each frame, and the logic input to the ObjectPass Judge provides the object pass score for each frame.

The logic output of the ObjectDetect Judge provides a pulse that indicates when a judgment has been made. In one mode of operation, called "output when processing", the leading edge of the pulse occurs when the inspection of an object begins, for example at the end of analysis step 540 in FIG. 2, and the trailing edge occurs when the inspection of an object is complete, for example at the end of analysis step 548. In another mode, called "output when done", the leading edge of the pulse occurs when the inspection of an object is complete, for example at the end of analysis step 548 in FIG. 2, and the trailing edge occurs some time after that, for example at the end of idle step 580.

The logic output of the ObjectPass Judge provides a level that indicates whether the most recently inspected object passed. The level changes state when the inspection of an object is complete, for example at the end of analysis step 548.

Figure 10:
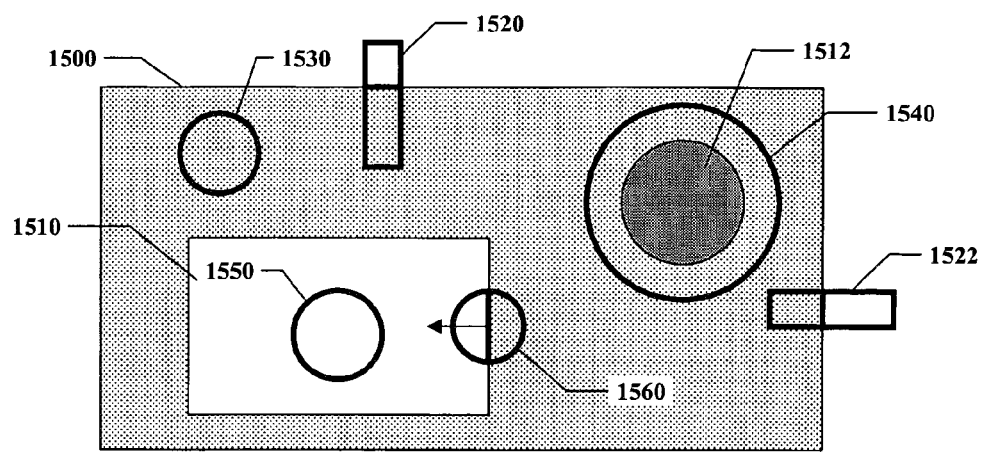
FIG. 10 shows a portion of an exemplary configuration of a vision detector that may be used to inspect an exemplary object.

FIG. 10 shows an example of how Photos can be used to inspect an object. FIG. 10 represents an image of object 110 (from FIG. 1), containing label feature 120 and hole feature 124, with superimposed graphics representing the Photos, and is displayed on an HMI 830 for a user to view and manipulate. A display of an image and superimposed graphics on an HMI is called an image view.

FIG. 10 represents an image view, showing an object 1500 containing a label 1510 and a hole 1512. The object in this example contains 6 visible features to be inspected, corresponding to the two Locators and four Detectors further described below.

A Locator 1520 is used to detect and locate the top edge of the object, and another Locator 1522 is used to detect and locate the right edge.

A Brightness Detector 1530 is used to help detect the presence of the object. In this example the background is brighter than the object, and the sensitivity threshold is set to distinguish the two brightness levels, with the logic output inverted to detect the darker object and not the brighter background.

Together the Locators 1520 and 1522, and the Brightness Detector 1530, provide the evidence needed to judge that an object has been detected, as further described below.

A Contrast Detector 1540 is used to detect the presence of the hole 1512. When the hole is absent the contrast would be very low, and when present the contrast would be much higher. A Spot Detector could also be used.

An Edge Detector 1560 is used to detect the presence and position of the label 1510. If the label is absent, mis-positioned horizontally, or significantly rotated, the analog output of the Edge Detector would be very low.

A Brightness Detector 1550 is used to verify that the correct label has been applied. In this example, the correct label is white and incorrect labels are darker colors.

As the object moves from left to right through the field of view of the vision detector, Locator 1522 tracks the right edge of the object and repositions Brightness Detector 1530, Contrast Detector 1540, Brightness Detector 1550, and Edge Detector 1560 to be at the correct position relative to the object. Locator 1520 corrects for any variation in the vertical position of the object in the field of view, repositioning the detectors based on the location of the top edge of the object. In general Locators can be oriented in any direction.

A user can manipulate Photos in an image view by using well-known HMI techniques. A Photo can be selected by clicking with a mouse, and its ROI can be moved, resized, and rotated by dragging. Additional manipulations for Locators are described in the Vision Detector Method and Apparatus.

Figure 11:
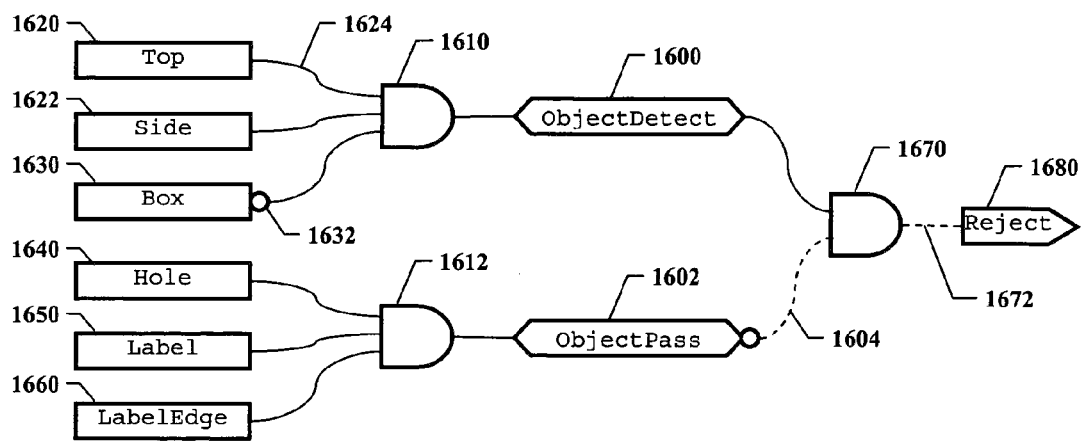
FIG. 11 shows another portion of the configuration corresponding to the exemplary setup of FIG. 10.

FIG. 11 shows a logic view containing a wiring diagram corresponding to the example setup of FIG. 10. A wiring diagram shows all Gadgets being used to inspect objects and interface to automation equipment, and the connections between logic inputs and outputs of the Gadgets. A wiring diagram is displayed on an HMI 830 for a user to view and manipulate. A display of gadgets and their logic interconnections on an HMI is called a logic view.

Referring still to the wiring diagram of FIG. 11, a Locator 1620 named "Top", corresponding to Locator 1520 in the image view of FIG. 10, is connected to AND Gate 1610 by wire 1624. Similarly, "Side" Locator 1622, corresponding to Locator 1522, and "Box" Detector 1630, corresponding to Brightness Detector 1530, are also wired to AND Gate 1610. The logic output of "Box" detector 1630 is inverted, as shown by the small circle 1632 and as described above to detect the darker object against a lighter background.

The logic output of AND Gate 1610 represents the level of confidence that the top edge of the object has been detected, the right edge of the object has been detected, and the background has not been detected. When confidence is high that all three conditions are true, confidence is high that the object itself has been detected. The logic output of AND Gate 1610 is wired to the ObjectDetect Judge 1600 to be used as the object detection weight for each frame.

Since the logic input to the ObjectDetect Judge in this case depends on the current frame, the vision detector is operating in visual event detection mode. To operate in external trigger mode, an Input Gadget would be wired to ObjectDetect. To operate in continuous analysis mode, nothing would be wired to ObjectDetect.

The choice of Gadgets to wire to ObjectDetect is made by a user based on knowledge of the application. In the example of FIGS. 10 and 11, a user may have determined that detecting just the top and right edges was not sufficient to insure that an object is present. Note that Locator 1522 might respond to the label's left edge just as strongly as the object's right edge, and perhaps at this point in the production cycle Locator 1520 might occasionally find some other edge in the background. By adding Detector 1530, and requiring all three conditions by means of AND Gate 1610, object detection is made reliable.

In the wiring diagram, Contrast Detector "Hole" 1640, corresponding to Contrast Detector 1540, Brightness Detector "Label" 1650, corresponding to Brightness Detector 1550, and Edge Detector "LabelEdge" 1660, corresponding to Edge Detector 1560, are wired to AND Gate 1612. The logic output of AND Gate 1612 represents the level of confidence that all three image features have been detected, and is wired to ObjectPass Judge 1602 to provide the object pass score for each frame.

The logic output of ObjectDetect Judge 1600 is wired to AND Gate 1670. The logic output of ObjectPass Judge 1602 is inverted and also wired to AND Gate 1670. The ObjectDetect Judge is set to "output when done" mode, so a pulse appears on the logic output of ObjectDetect Judge 1600 after an object has been detected and inspection is complete. Since the logic output of ObjectPass 1602 has been inverted, this pulse will appear on the logic output of AND Gate 1670 only if the object has not passed inspection. The logic output of AND Gate 1670 is wired to an Output gadget 1680, named "Reject", which controls an output signal from the vision detector than can be connected directly to a reject actuator 170. The Output Gadget 1680 is configured by a user to perform the appropriate delay 570 needed by the downstream reject actuator.

A user can manipulate Gadgets in a logic view by using well-known HMI techniques. A Gadget can be selected by clicking with a mouse, its position can be moved by dragging, and wires can be created by a drag-drop operation.

To aid the user's understanding of the operation of the vision detector, Gadgets and/or wires can change their visual appearance to indicate fuzzy logic values. For example, Gadgets and/or wires can be displayed red when the logic value is below 0.5, and green otherwise. In FIG. 11, wires 1604 and 1672 are drawn with dashed lines to indicate a logic value below 0.5, and other wires, for example wire 1624, are drawn solid to indicate logic values equal to or greater than 0.5.

One skilled in the art will recognize that a wide variety of objects can be detected and inspected by suitable choice, configuration, and wiring of Gadgets. One skilled in the art will also recognize that the Gadget class hierarchy is only one of many software techniques that could be used to practice the Vision Detector Method and Apparatus.

Operation of the Present Invention to Configure a Vision Detector

The invention herein described can be used to configure any image analysis device, including prior art vision systems; the illustrative embodiment described in the following is based on configuring a vision detector.

Figure 12:
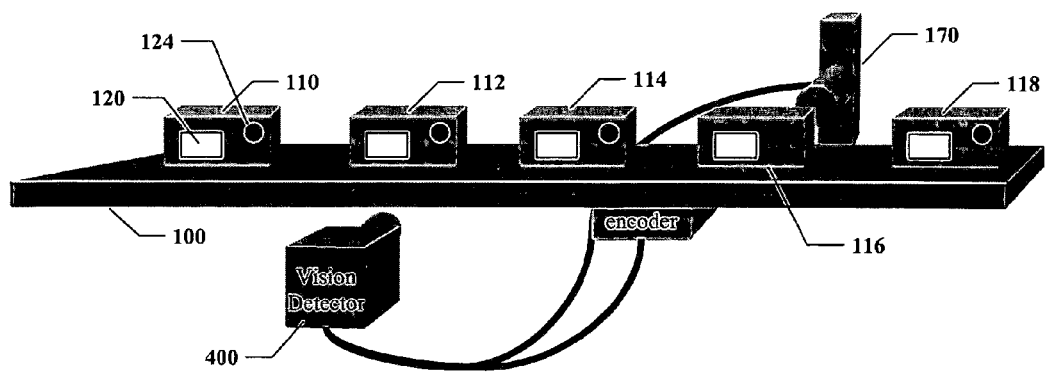
FIG. 12 shows a production line containing objects to be used for configuring a vision detector.

FIG. 12 shows a portion of a production line such as may be used to practice the aspect of the invention related to configuring a vision detector. FIG. 12 is identical to FIG. 1, except that vision detector 400 has not yet been configured to inspect objects, and so defective object 116 has not been removed from conveyer 100 by reject mechanism 170. In all other respects the production line is operating under normal manufacturing conditions, including conveyer speed and ambient illumination, and contains objects 110, 112, 114, 116, and 118 that are representative of the objects to be inspected, desirably including, in the case of defective object 116, examples of flaws to be detected.

The vision detector 400 captures a sequence of images of its field of view. Referring to the illustrative apparatus of FIG. 5, illumination 940 illuminates the field of view and imager 960 captures images, which are stored in memory 910 via PPI 970, DMA 972, and memory controller 974. As explained in detail in the above description of FIG. 5, the frame rate is sufficient to obtain multiple images of each object as it passes through the field of view. Furthermore, the memory 910 is sufficiently large that multiple images from each of multiple objects can be stored.

Figure 13:
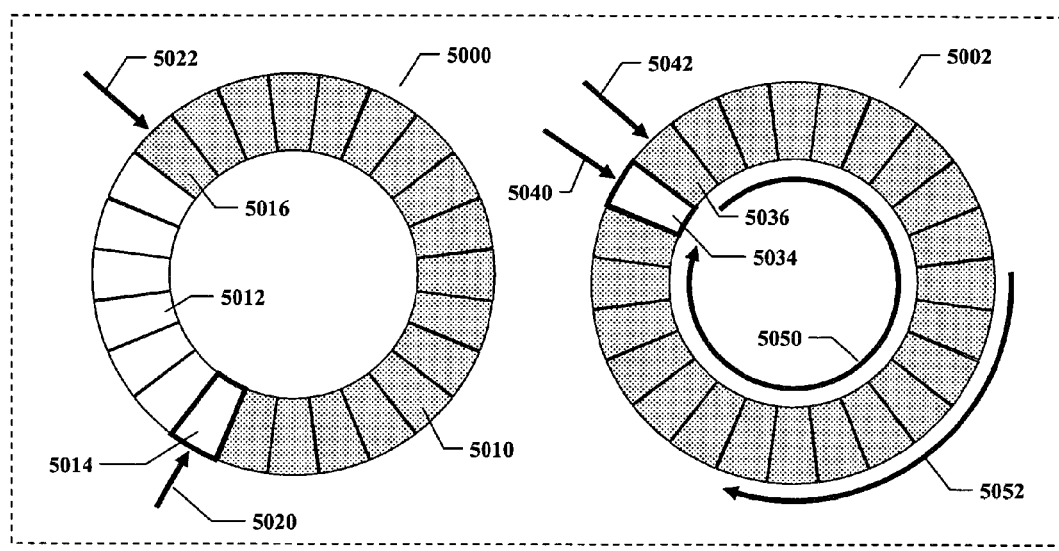
FIG. 13 shows a memory arrangement for storing images for configuring a vision detector.

FIG. 13 shows details of the organization of memory 910 used in an illustrative embodiment. A portion of the memory is used for a ring buffer 5000, wherein each element of the ring buffer, including example elements 5010, 5012, 5014, and 5016, holds an entire captured image. In an illustrative embodiment where the imager 960 is an LM9630, for example, each element of ring buffer 5000 would contain 128×100 8-bit pixels.

For clarity in the drawing ring buffer 5000 is shown to contain only 24 elements, but in practice a higher number is desirable. In one embodiment 160 elements are used, which requires just under two megabytes of storage, and which is capable of storing about 0.8 seconds of a production run at 200 frames/second, or about 0.32 seconds at 500 frames/second. Clearly, lower frame rates can be used to increase the amount of time for which images can be stored.

The operation and implementation of ring buffers are well-known in the art. In the illustrative embodiment of FIG. 13, shaded elements such as example element 5010 are in use (contain a previously captured image), and unshaded elements such as example element 5012 are available. A write pointer 5020 indicates the next available element 5014 of the ring buffer, into which the next captured image will be stored. A read pointer 5022 indicates the oldest in-use element 5016 (least recently stored). In the illustrative embodiment of FIG. 5, the DMA channel 972 allows captured images to be placed anywhere in memory 910, so that images can be captured directly into next available element 5014 without any need for copying. This is desirable given the need for very high frame rates.

At some point the ring buffer will become full, as is the case for full ring buffer 5002. Write pointer 5040 indicates the only available element 5034. In one embodiment, when the ring buffer becomes full image capture terminates. In another embodiment image capture continues, with the next capture overwriting oldest element 5036 indicated by read pointer 5042, and further continuing to overwrite elements and advance the pointers until some condition, such as a command from the human user, occurs to terminate the image capture. Once image capture has terminated, ring buffer 5002 contains a sequence of images 5050 available for display for a human user.

Figure 14:
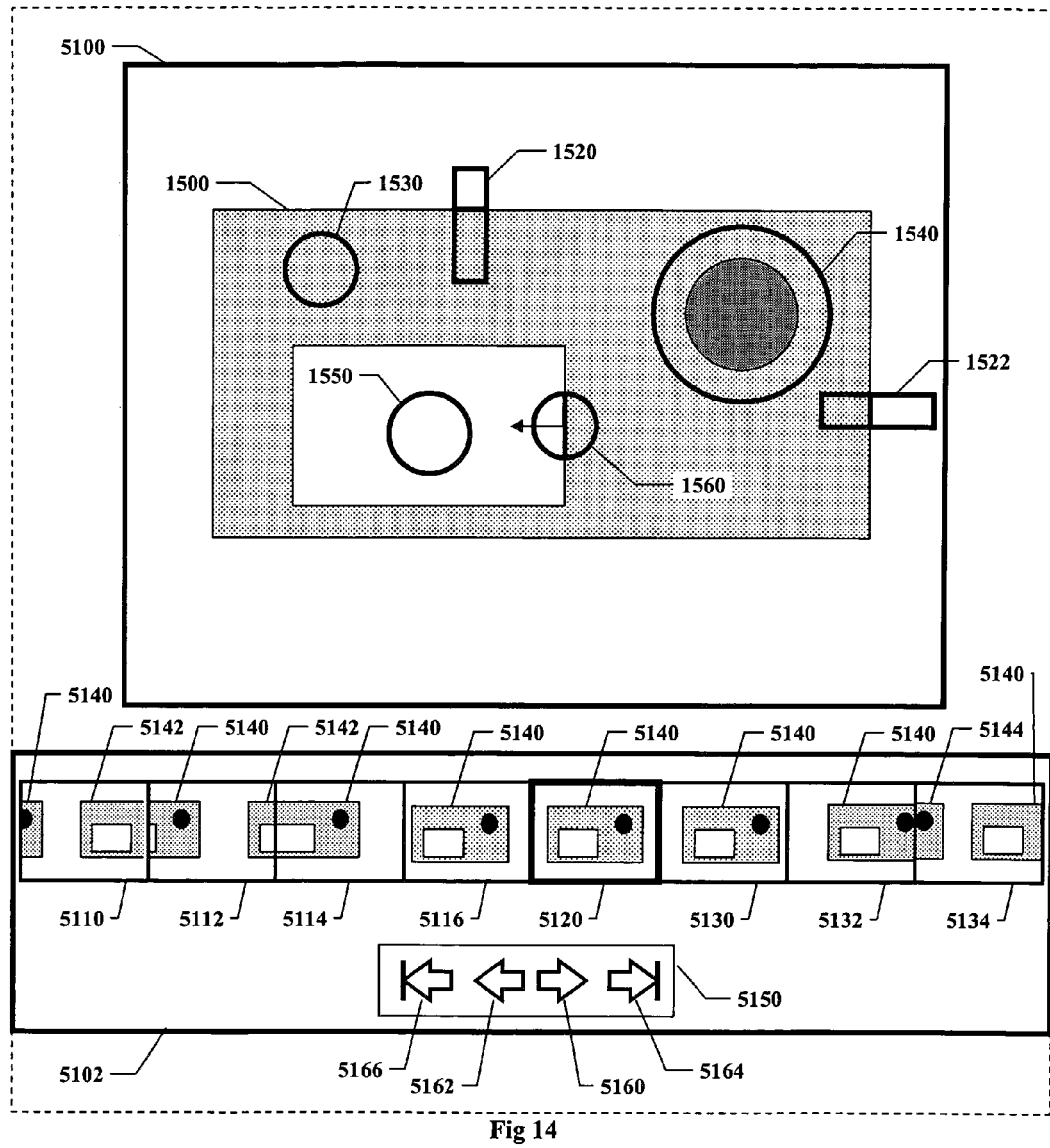
FIG. 14 shows a portion of a graphical user interface containing a filmstrip window and an image view window.

Referring back to FIG. 4, the vision detector may be connected to a human-machine interface (HMI) 830, via communications interface 840, for purposes of configuration. It is also possible for the HMI to be part of the vision detector 800, but this is less preferred because the HMI is generally not needed for production use, and so one HMI can be shared among many vision detectors. The HMI may run a graphical user interface (GUI) of conventional design, an illustrative portion of which is shown in FIG. 14.

The GUI allows a portion of the sequence of images 5050 stored in vision detector memory 910 to be displayed for a human user. In the illustrative embodiment of FIG. 14, a filmstrip window 5102 displays up to eight thumbnail images 5110, 5112, 5114, 5116, 5120, 5130, 5132, and 5134, each thumbnail image being a low-resolution version of a corresponding image in sequence of images 5050. Generally the thumbnail images correspond to consecutive images in the sequence, for example displayed portion 5052 (FIG. 13), but other arrangements may be useful, such as skipping some number of images between the corresponding thumbnails.

A set of scrolling controls 5150 is provided in filmstrip window 5102 for advancing the displayed portion 5052 forward or backward within the sequence of images 5050. Next image control 5160 advances displayed portion 5052 forward by one image, and previous image control 5162 advances displayed portion 5052 backward by one image. Controls 5164 and 5166 are described below.

Thumbnail 5120 displays a low-resolution image of object 5140, which may correspond for example to object 114 (FIG. 12). Object 5140 also appears in thumbnails 5116 and 5130 at slightly different viewing perspectives (positions within the field of view), and is partially present in thumbnails 5110, 5112, 5114, 5132, and 5134. A second object 5142, which may correspond for example to defective object 116, is partially present in thumbnails 5110 and 5112. A third object 5144, which may correspond for example to object 112, is partially present in thumbnails 5134. By issuing scrolling commands using scrolling controls 5150 the user can advance the displayed portion 5052 forward or backward to see any viewing perspective of any object that has been captured, as well as any other conditions that may be present in the field of view during normal production.

In the illustrative embodiment of FIG. 14, the image corresponding to thumbnail 5120, which is shown with a heavy outline, is also displayed at full resolution in image view window 5100. As scrolling commands advance the displayed portion forward and backward, different images will move into thumbnail 5120 and be displayed at full resolution in image view window 5100.

To configure the vision detector, the user issues scrolling commands until an image appears in image view window 5100 that is suitable to use as a first training image. Generally an image is suitable if the user judges it to be sufficiently similar in appearance to the typical objects that will be inspected. Note that object 1500 in image view window 5100, which is also shown in FIG. 10, corresponds to object 5140 in thumbnail 5120. Once a first training image has been chosen, the user configures the vision detector by creating one or more vision tools, for example Locators 1520 and 1522, Contrast Detector 1540, Brightness Detector 1550, and Edge Detector 1560. In this illustrative embodiment, a vision tool can be any Photo 1410 (FIG. 9). The type, position, size, orientation, and operating parameters of each created vision tool are chosen by the user to insure that objects similar in appearance to object 1500 in the first training image can be detected and inspected.

Once a configuration has been created using the first training image, it is desirable to confirm and possibly adjust the configuration using additional training images. Scrolling commands can be issued to choose a second training image, which will appear both in thumbnail 5120 and image view window 5100. The second training image can be used simply to assess the operation of previously created vision tools, or to update the configuration by creating additional vision tools, or adjusting the position, size, orientation, and/or operating parameters of previously created vision tools.

For example, the initial configuration created using the first training image may not have included Brightness Detector 1530, which as previously described is used in conjunction with Locators 1520 and 1522 to help detect the presence of the object. It may be that the user did not realize, looking only at the first training image, that Brightness Detector 1530 would be needed. In may be that only by considering a second training image where an object is only partially present in the field of view, or in which no object is present, could the user see that Brightness Detector 1530 is needed to prevent false detection.

Similarly, it may be that a second training image corresponding to defective object 116, which is dissimilar in appearance to the typical objects to be inspected, is necessary to properly adjust Contrast Detector 1540.

Operation of the Present Invention to Test a Vision Detector

During the process of configuring a vision detector it is desirable to test the configuration more extensively than can be accomplished using second training images to assess vision tool operation. It is further desirable that such a test include a large number of objects, and capture and store a limited number of images, where those images correspond to objects likely to represent incorrect decisions. Similar tests may also be desirable during actual production operation. It is desirable that the production environment, including conveyer speed and ambient illumination, be identical during configuration and production operation. Comparing FIG. 1, which shows production operation, with FIG. 12, which shows configuration, it can be seen that the only difference is that in FIG. 12 reject actuator 170 is not receiving reject signals from vision detector 400.

In an illustrative embodiment used for testing a vision detector, the vision detector is configured for detecting and inspecting discrete objects. The vision detector may use visual event detection, operating as shown in FIG. 2, or an external trigger signal, operating as shown in FIG. 3. It will have a configuration such as that shown in FIGS. 10 and 11.

Referring to FIG. 2, a group of seven frames starting with active frame 540 and ending with inactive frame 548 (timeline portion 500) influences the detection and inspection of object 1. Similarly, a group of five frames corresponding to timeline portion 510 influences the detection and inspection of object 2. If an object such as object 1 or object 2 is likely to be of interest to a human user, typically because it might represent an incorrect decision, the invention provides methods and systems to store and display the frames in the group. In one embodiment, the group to be stored and displayed includes inactive frames such as frame 542 and terminating frames 546 and 548. In an illustrative embodiment, terminating frames such as 546 and 548 are omitted from the group to be stored and displayed.

Referring to FIG. 3, where an external trigger is used, the group of frames to be stored and displayed for object 1 includes all frames captured and analyzed for that object, i.e. frames 640, 642, and 644.

As previously described, objects are analyzed to determine results that contain information about the status of the object. The results may be as simple as whether or not the object passes inspection. In an illustrative embodiment, the results include numbers that indicate a relative confidence that the object has been detected, and that it passes inspection. For example, one such number may be the weighted average of object pass scores, where an object is judged to pass inspection if that number exceeds some decision threshold, as shown in equation 5 where the decision threshold is 0.5. Similarly, when using visual event detection, one such number may be the number of active frames or the total object detection weight, which is compared to a decision threshold to determine if an object has been detected (for more detail on these numbers see the above description of FIG. 7).

These results are used to determine if the group of frames for the corresponding object might be of interest to a human user, in which case they would be stored for subsequent display. The user may be interested in all objects, or just those that pass or just those that do not pass. It is often most desirable to store and display images corresponding to objects likely to represent incorrect decisions, because these represent both very rare occurrences, and situations most in need of careful study. An incorrect decision is likely when numbers that indicate a relative confidence are close to the decision threshold.

The stored groups of frames is a set of images, a portion of which can be displayed by a graphical user interface such as that shown in FIG. 14 as described above. The scrolling controls 5150 contain, in addition to next image control 5160 and previous image control 5162, next group control 5164 and previous group control 5166, which advance the displayed portion forward and backward, respectively, by one group.

Figure 15:
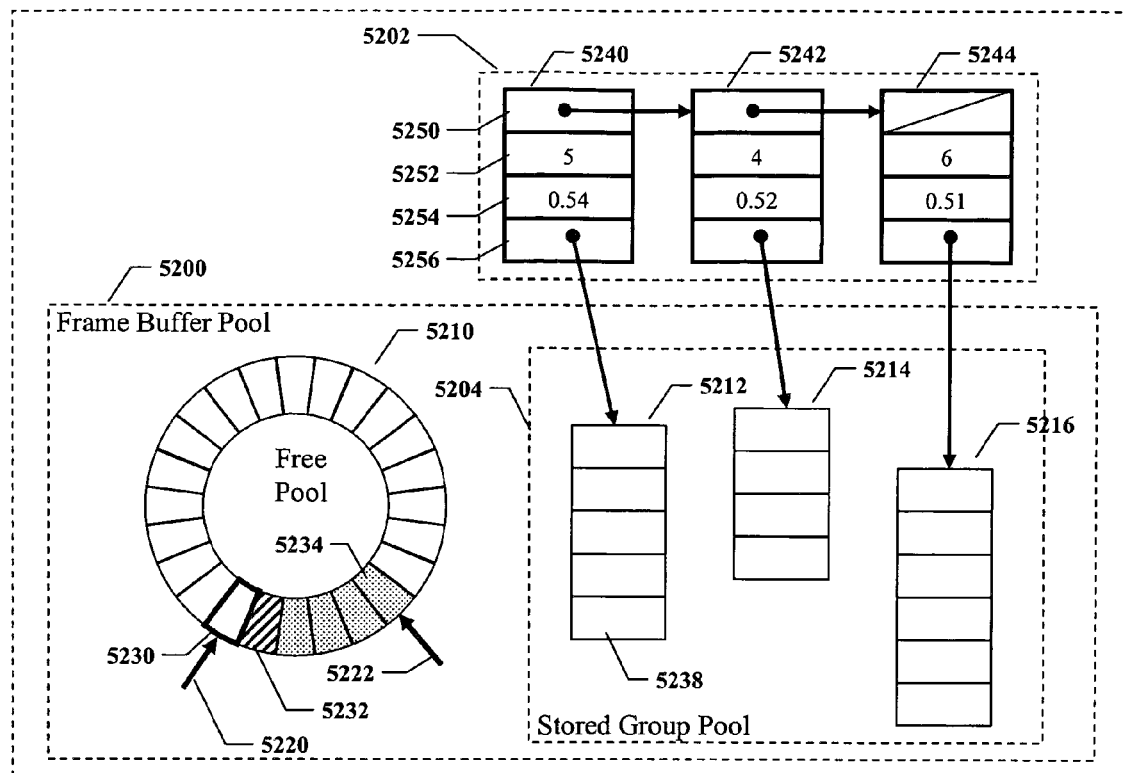
FIG. 15 shows a memory arrangement for storing images for testing a vision detector.

FIG. 15 shows details of the organization of a portion of memory 910 (FIG. 5) used in an illustrative embodiment. A frame buffer pool 5200 contains a number of individual frame buffers, such as frame buffers 5230, 5232, 5234, and 5238, to be used for various purposes. A free pool 5210 is organized as a ring buffer and used to capture and analyze frames for one object. Write pointer 5220 indicates the next available frame buffer 5230, into which the next frame is captured. Simultaneously with image capture into frame buffer 5230, the previous image in frame buffer 5232 is being analyzed. Frames in the current group which have previously been captured and analyzed are shaded, starting with the first frame buffer 5134 indicated by read pointer 5222.

Note that if an active frame for a new object has not yet been found, then there is no current group, and so the read pointer 5222 will indicate frame buffer 5232 and will advance for each new frame until a new object is found. Note further that if the free pool 5210 fills up, some of the oldest frames in the group will not be able to be stored.

When an object has been analyzed and the result containing information about the status of the object is determined, the group is complete. If the result indicates that the group is not to be stored for subsequent display, the images are discarded by simply advancing the read pointer 5222. If the group is to be stored, the frame buffers are removed from the free pool 5210 and added to stored group pool 5204, which includes stored groups 5212, 5214, and 5216. If the number of frame buffers in the free pool 5210 becomes too small after removing the new stored group, then one or more older stored groups may be taken from stored group pool 5204 and placed back in the free pool. Those older groups will no longer be available for display.

In an illustrative embodiment, frame buffers are never copied. Instead frame buffers are moved between free pool 5210 and stored group pool 5204 by pointer manipulation using techniques well known in the art.

A list of stored groups 5202 is maintained, including list elements 5240, 5242, and 5244. List element 5240, for example, contains next element pointer 5250, frame buffer count 5252, result information 5254, and stored group pointer 5256. Result information 5254 includes the relative confidence number used to decide whether to store the group. Note in this case that the decision threshold is 0.5, and the three stored groups have confidence numbers near the threshold. Note further that the list is sorted in order of closeness to the decision threshold. If a stored group needs to be moved from stored group pool 5204 and placed back in free pool 5210, the first group on the list, which is farthest from the decision threshold, is taken.

The foregoing has been a detailed description of illustrative embodiments of the invention. Various modifications and additions can be made without departing from the sprit and scope thereof. For example, the layout and control options of the GUI are highly variable according to alternate embodiments. The number and size of thumbnails in the filmstrip window of the GUI are also subject to variation. Accordingly, this description is meant to be taken only by way of example, and not to otherwise limit the scope of the invention.

We claim:

1. A method for testing a vision detector comprising:
   continuously moving a sequence of objects relative to a field of view of the vision detector;
   capturing a plurality of groups of frames, each frame of the plurality of groups of frames comprising an image of the field of view, such that each group of frames of the plurality of groups of frames comprises a plurality of images of one corresponding object in the sequence of objects;
   analyzing each object to determine a plurality of results corresponding to the plurality of groups of frames, each result in the plurality of results comprising information about the status of the object corresponding to the group of frames;
   storing, responsive to the plurality of results, a selected set of groups of frames from the plurality of groups of frames, the set of groups of frames comprising a stored set of images; and
   displaying a portion of the stored set of images for viewing by a human user, the portion displayed chosen responsive to scrolling commands from the human user, the scrolling commands capable of advancing the portion displayed forward and backward in the stored set of images, wherein
   each result in the plurality of results comprises a number that indicates a relative confidence that the corresponding object was detected;
   the number is compared to a decision threshold to decide whether the corresponding object was detected; and the selected set of groups of frames corresponds to objects for which the corresponding numbers are close to the decision threshold.

2. The method of claim 1, wherein
the displaying step further comprises
displaying the portion of the stored set of images as a succession of low-resolution "thumbnail" images in a filmstrip window of a graphical user interface, and
displaying at least one image of the portion of the stored set of images as a full-resolution image in an image view window; and
the scrolling commands are responsive to the human user interacting with the graphical user interface.

3. The method of claim 2, wherein
the stored set of images are stored in a memory on the vision detector;
the graphical user interface is running on a separate human-machine interface;
the low-resolution "thumbnail" images are derived from the stored set of images by the vision detector and transmitted to the human-machine interface for display in the filmstrip window; and
the full-resolution image is transmitted by the vision detector to the human-machine interface only when needed for display in the image window.

4. The method of claim 1, wherein
each result in the plurality of results indicates whether the corresponding object passes inspection; and
the selected set of groups of frames corresponds to objects for which the corresponding results indicate that the objects pass inspection.

5. The method of claim 1, wherein
each result in the plurality of results indicates whether the corresponding object passes inspection; and
the selected set of groups of frames corresponds to objects for which the corresponding results indicate that the objects do not pass inspection.

6. The method of claim 1, wherein
each result in the plurality of results comprises a number that indicates a relative confidence that the corresponding object passes inspection;
the number is compared to a decision threshold to decide whether the corresponding object passes inspection; and
the selected set of groups of frames corresponds to objects for which the corresponding numbers are close to the decision threshold.

7. An apparatus comprising:
a sequence of objects;
a vision detector having a field of view, the sequence of objects in continuous motion relative to the field of view, the vision detector configured to
capture a plurality of groups of frames, each frame of the plurality of groups of frames comprising an image of the field of view, such that each group of frames of the plurality of groups of frames comprises a plurality of images of one corresponding object in the sequence of objects,
analyze each object to determine a plurality of results corresponding to the plurality of groups of frames, each result in the plurality of results comprising information about the status of the object corresponding to the group of frames;
a memory configured to store, responsive to the plurality of results, a selected set of groups of frames from the plurality of groups of frames, the set of groups of frames comprising a stored set of images; and
a human-machine interface configured to display a portion of the stored set of images for viewing by a human user, the portion displayed chosen responsive to scrolling commands from the human user, the scrolling commands capable of advancing the portion displayed forward and backward in the stored set of images, wherein
each result in the plurality of results comprises a number that indicates a relative confidence that the corresponding object was detected;
the number is compared to a decision threshold to decide whether the corresponding object was detected; and
the selected set of groups of frames corresponds to objects for which the corresponding numbers are close to the decision threshold.

8. The apparatus of claim 7, wherein
the human-machine interface further comprises
a filmstrip window of a graphical user interface configured to display the portion of the stored set of images as a succession of low-resolution "thumbnail" images, and
an image view window configured to display at least one image of the portion of the stored set of images as a full-resolution image in; and
the scrolling commands are responsive to the human user interacting with the graphical user interface.

9. The apparatus of claim 8, wherein
the image analysis device is further configured to derive the low-resolution "thumbnail" images from the stored set of images;
the human-machine interface runs the graphical user interface; and the apparatus further comprising
a memory on the image analysis device configured to store the stored set of images, and
a communications interface configured to transmit the low-resolution "thumbnail" images from the image analysis device to the human-machine interface for display in the filmstrip window, and to transmit the full-resolution image to the human-machine interface only when needed for display in the image view window.

10. The apparatus of claim 7, wherein
each result in the plurality of results indicates whether the corresponding object passes inspection; and
the selected set of groups of frames correspond to objects for which the corresponding results indicate that the objects pass inspection.

11. The apparatus of claim 7, wherein
each result in the plurality of results indicates whether the corresponding object passes inspection; and
the selected set of groups of frames corresponds to objects for which the corresponding results indicate that the objects do not pass inspection.

12. The apparatus of claim 7, wherein
each result in the plurality of results comprises a number that indicates a relative confidence that the corresponding object passes inspection;
the number is compared to a decision threshold to decide whether the corresponding object passes inspection; and
the selected set of groups of frames corresponds to objects for which the corresponding numbers are close to the decision threshold.

* * * * *